United States Patent
Bauer et al.

(10) Patent No.: US 11,639,886 B2
(45) Date of Patent: May 2, 2023

(54) DIFFUSION MONITORING PROTOCOL FOR OPTIMIZED TISSUE FIXATION

(71) Applicant: Ventana Medical Systems, Inc., Tucson, AZ (US)

(72) Inventors: Daniel Bauer, Tucson, AZ (US); David Chafin, Tucson, AZ (US); Michael Otter, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 393 days.

(21) Appl. No.: 16/888,935

(22) Filed: Jun. 1, 2020

(65) Prior Publication Data

US 2020/0319073 A1    Oct. 8, 2020

Related U.S. Application Data

(60) Division of application No. 15/624,700, filed on Jun. 15, 2017, now Pat. No. 10,712,250, which is a
(Continued)

(51) Int. Cl.
*G01N 1/00* (2006.01)
*G01N 13/00* (2006.01)
(Continued)

(52) U.S. Cl.
CPC ............... *G01N 13/00* (2013.01); *G01N 1/30* (2013.01); *G01N 29/024* (2013.01); *G01N 29/07* (2013.01);
(Continued)

(58) Field of Classification Search
None
See application file for complete search history.

(56) References Cited

U.S. PATENT DOCUMENTS 8,845,982 B2   9/2014  Giovanni et al.
10,126,216 B2  11/2018 Chafin et al.
(Continued)

FOREIGN PATENT DOCUMENTS

EP      2458365 B1      4/2019
WO   2011109769 A1      9/2011
(Continued)

OTHER PUBLICATIONS

Bauer et al, 2014, "Dynamic Subnanosecond Time-of-Flight Detection for Ultra-precise Diffusion Monitoring and Optimization of Biomarker Preservation", Proceedings of SPIE, 9040:90400B1-90400B10.
(Continued)

*Primary Examiner* — Jyoti Nagpaul
(74) *Attorney, Agent, or Firm* — Charney IP Law LLC; Thomas M. Finetti

(57) ABSTRACT

The subject disclosure presents systems and computer-implemented methods for evaluating a tissue sample that has been removed from a subject. A change in speed of the energy traveling through the sample is evaluated to monitor changes in the biological sample during processing. The rate of change in the speed of the energy is correlated with the extent of diffusion. A system for performing the method can include a transmitter that outputs the energy and a receiver configured to detect the transmitted energy. A time-of-flight of acoustic waves and rate of change thereof is monitored to determine an optimal time for soaking the tissue sample in a fixative.

20 Claims, 13 Drawing Sheets

Related U.S. Application Data continuation of application No. PCT/EP2015/080254, filed on Dec. 17, 2015.

(60) Provisional application No. 62/097,520, filed on Dec. 29, 2014, provisional application No. 62/093,173, filed on Dec. 17, 2014, provisional application No. 62/093,151, filed on Dec. 17, 2014.

(51) Int. Cl.
| | |
|---|---|
| *G01N 29/07* | (2006.01) |
| *G01N 29/024* | (2006.01) |
| *G01N 1/30* | (2006.01) |
| *G01N 29/44* | (2006.01) |

(52) U.S. Cl.
CPC ....... *G01N 29/44* (2013.01); *G01N 2013/003* (2013.01); *G01N 2291/011* (2013.01); *G01N 2291/0245* (2013.01); *G01N 2291/02475* (2013.01)

(56) References Cited

U.S. PATENT DOCUMENTS

| | | |
|---|---|---|
| 10,267,769 B2 | 4/2019 | Otter et al. |
| 2012/0129169 A1 | 5/2012 | Giovanni et al. |

FOREIGN PATENT DOCUMENTS

| | | | |
|---|---|---|---|
| WO | WO2011/109769 | * | 9/2011 |
| WO | 2012110646 A1 | | 8/2012 |

OTHER PUBLICATIONS

Bussolati, 2011, "Formalin Fixation at Low Temperature Better Preserves Nucleic Acid Integrity," PLoS One, 6(6): e21043 (8pp).

International Search Report and Written Opinion for PCT/EP2015/080254, dated Jun. 29, 2017.

\* cited by examiner

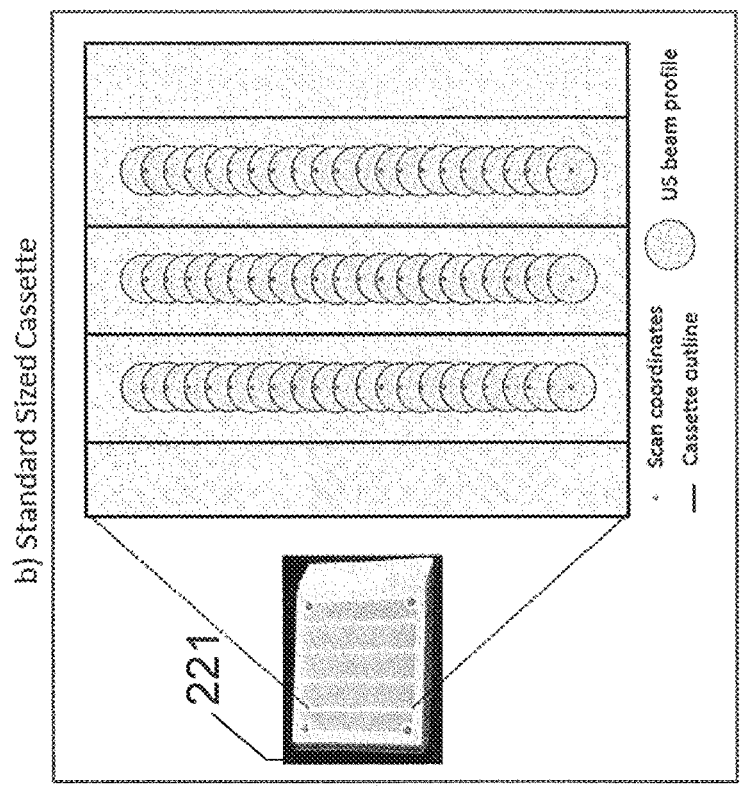
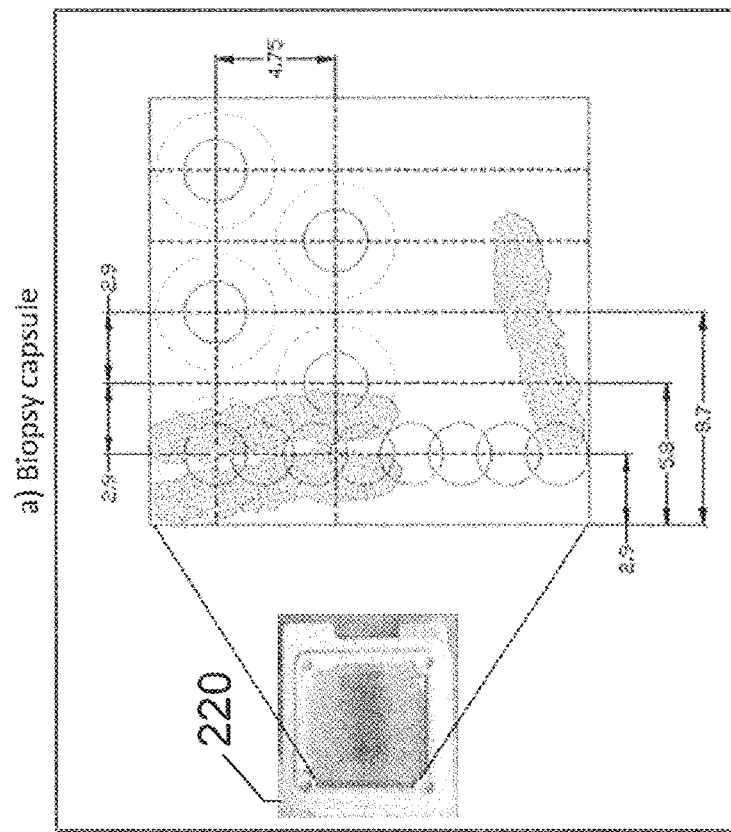
FIG. 2A
FIG. 2B

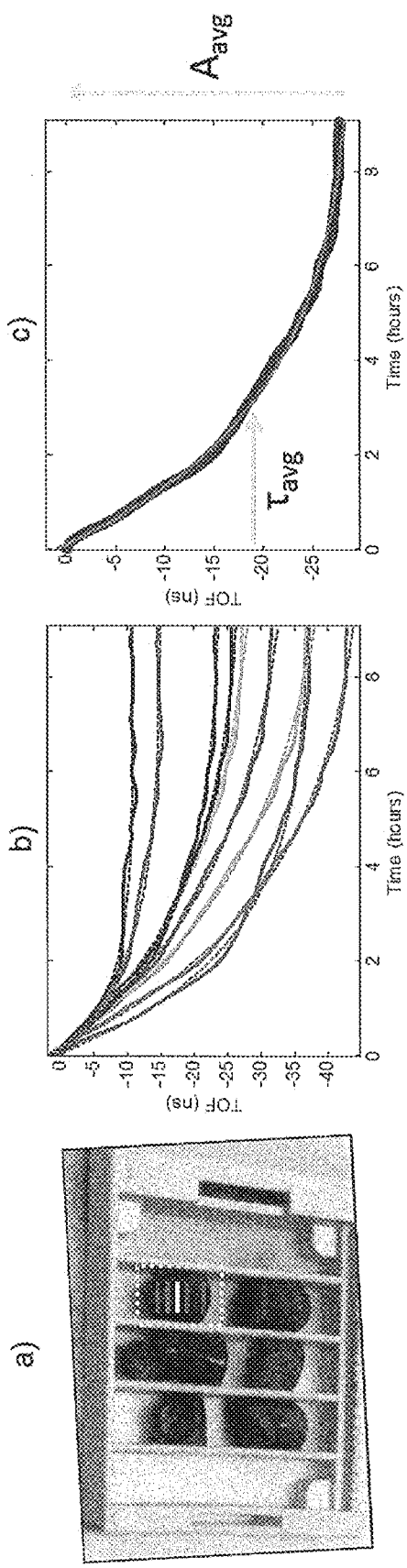

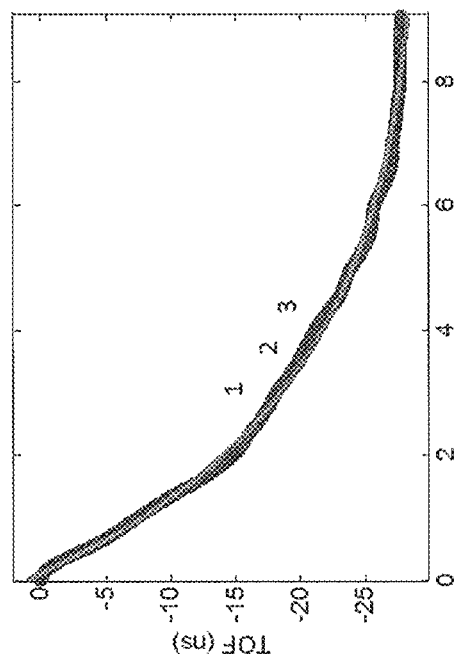
FIG. 8A
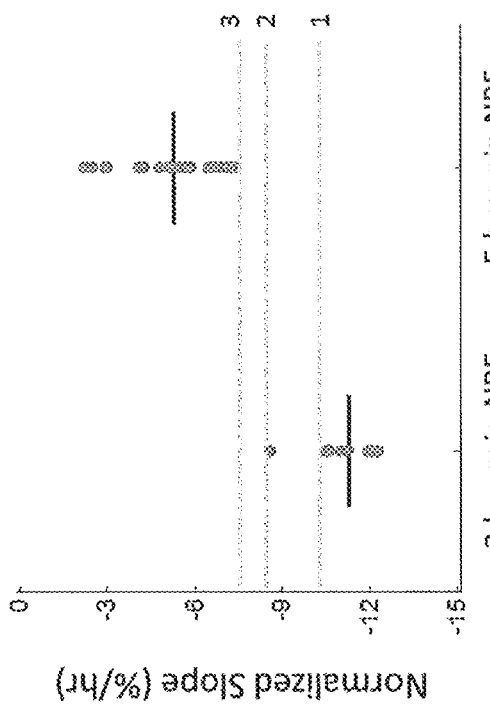
FIG. 8B
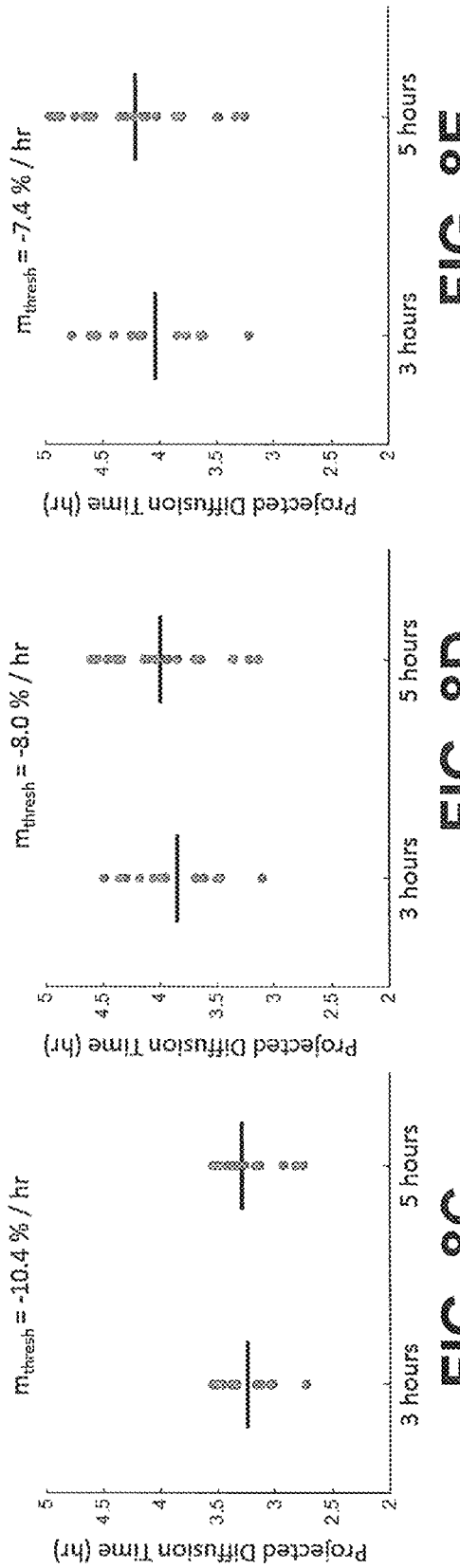
FIG. 8C
FIG. 8D
FIG. 8E

DIFFUSION MONITORING PROTOCOL FOR OPTIMIZED TISSUE FIXATION

CROSS-REFERENCE TO RELATED APPLICATIONS

This application is a divisional of U.S. application Ser. No. 15/624,700 filed on Jun. 15, 2017, which application is a continuation of International Patent Application No. PCT/EP2015/080254 filed Dec. 17, 2015, which claims priority to and the benefit of U.S. Provisional Patent Application No. 62/093,151, filed Dec. 17, 2014, U.S. Provisional Patent Application No. 62/093,173, filed Dec. 17, 2014, and U.S. Provisional Patent Application No. 62/097,520, filed Dec. 29, 2014, all of which prior patent applications are incorporated by reference herein in their entireties.

BACKGROUND OF THE SUBJECT DISCLOSURE

Field of the Subject Disclosure

The present subject disclosure relates to analysis of tissue specimens. More particularly, the present subject disclosure relates to monitoring processing of tissue samples.

Background of the Subject Disclosure

In the analysis of biological specimens such as tissue sections, blood, cell cultures and the like, biological specimens are stained with one or more combinations of stain and biomarkers, and the resulting assay is viewed or imaged for further analysis. Observing the assay enables a variety of processes, including diagnosis of disease, assessment of response to treatment, and development of new drugs to fight disease. An assay includes one or more stains conjugated to an antibody that binds to protein, protein fragments, or other objects of interest in the specimen, hereinafter referred to as targets or target objects. The antibodies or other compounds that bind a target in the specimen to a stain are referred to as biomarkers in this subject disclosure. Some biomarkers have a fixed relationship to a stain (e.g., the often used counterstain hematoxylin), whereas for other biomarkers, a choice of stain may be used to develop and create a new assay.

Prior to being prepared on an assay for imaging, biological specimens such as tissue sections from human subjects are often placed in a liquid that will suspend the metabolic activities of the cells. This process is commonly referred to as "fixation" and can be accomplished by several different types of liquids. The most common fixative in use by anatomical pathology labs is 10% neutral buffered formalin (NBF). This fixative forms cross-links between formaldehyde molecules and amine containing cellular molecules. In addition, this type of fixative preserves proteins for storage. When used at room temperature, NBF diffuses into a tissue section and cross-links proteins and nucleic acids, thereby halting metabolism, preserving biomolecules, and readying the tissue for paraffin wax infiltration. The formalin can be at slightly elevated temperature (i.e., higher than room temperature) to further increase the cross-linking rate, whereas lower temperature formalin can significantly decrease the cross-linking rate. For this reason, histologists typically perform tissue fixation at room temperature or higher.

Several effects are often observed in tissues that are either under exposed or over exposed to formalin. If formalin has not diffused properly through the tissue samples, outer regions of the tissue samples exposed to formalin may be over-fixed and interior regions of the tissue samples not exposed to formalin may be under-fixed, resulting in very poor tissue morphology. In under-fixed tissue, subsequent exposure to ethanol often shrinks the cellular structures and condenses nuclei since the tissues will not have the chance to form a proper cross-linked lattice. When under-fixed tissue is stained, such as with hematoxylin and eosin (H&E), many white spaces may be observed between the cells and tissue structures, nuclei may be condensed, and samples may appear pink and unbalanced with the hematoxylin stain. Tissues that have been exposed to excess amounts of formalin or too long typically do not work well for subsequent immunohistochemical processes, presumably because of nucleic acid and/or protein denaturation and degradation. As a result, the optimal antigen retrieval conditions for these tissues do not work properly and therefore the tissue samples appear to be under stained.

Proper medical diagnosis and patient safety often require properly fixing the tissue samples prior to staining. Accordingly, guidelines have been established by oncologists and pathologists for proper fixation of tissue samples. For example, according to the American Society of Clinical Oncology (ASCO), the current guideline for fixation time in neutral buffered formalin solution for HER2 immunohistochemistry analysis is at least 6 hours, preferably more, and up to 72 hours. However, this is a broad and inefficient protocol, and the current standard of care is for laboratories to process tissues with a custom unverified protocol that is not standardized and sub-optimal. For example, an existing protocol includes a cold+warm fixation with NBF that is beneficial to preservation of histomorphology as well as proteins with activation states (originally termed the 2+2 protocol due to successive immersion of tissues for 2 hours into 4° C. and 45° C. NBF with tissues up to 4 mm in thickness), based on the principle that enough formaldehyde diffused into all of the tissue during the diffusion (cold step) before initiating crosslinking (warm step). However, this protocol was derived on a purely empirical basis by altering diffusion times and temperatures and examining the quality of histomorphology and immunohistochemistry staining. Accordingly, it is desirable to develop a process or system for monitoring diffusion of fixatives through a tissue sample to determine whether the fixative has infused the entire tissue sample to minimize or limit under-fixed tissue or over-fixed tissue and to better preserve biological molecules, tissue morphology, and/or post-translational modification signals before significant degradation occurs.

SUMMARY OF THE SUBJECT DISCLOSURE

The subject disclosure solves the above-identified problems by presenting systems and computer-implemented methods for monitoring diffusion of a fixative solution into a tissue sample in order to ensure optimal fixation and, therefore, high quality staining for downstream assays. The monitoring is based on changes in the speed of sound caused by diffusion of fixative solution into the tissue sample. As the fixative penetrates into tissue, it displaces interstitial fluid. This fluid exchange slightly changes the composition of the tissue volume because interstitial fluid and fixative have discrete sound velocities. The output ultrasound pulse thus accumulates a small transit time differential that increases as more fluid exchange occurs. The rate at which the transit time differential changes can be used as a proxy measurement for tracking the rate of diffusion, which, as shown herein, can be used to accurately predict quality of fixation and a subsequent stain.

The subject disclosure therefore discloses systems and methods for dynamically tracking and quantifying the fixative diffusion. The active state of the fixative diffusion is then correlated with staining results to develop a metric to determine precisely when a sample has sufficient fixative penetration to stain well. This helps assure that samples are adequately fixed by automatically lengthening the amount of time slow tissues need to be exposed to fixative, while providing workflow improvements toward shortening the amount of tissue processing time required for tissue samples and adding quality assurance and report generation for tissue processing laboratories. The predictive metric is validated with results from a large tissue collection study. Experimental results are shown that confirm that this metric ensures ideally-stained cross-sections. A tissue preparation system may be programmed to monitor said diffusion of any tissue sample and determine an optimal time for the soak.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A and 2B respectively show depictions of ultrasound scan patterns from a biopsy capsule and from a standard-sized cassette, according to an exemplary embodiment of the subject disclosure.

FIGS. 3A-C show time-of-flight (ToF) traces and an average diffusion curve generated from a tissue sample in a standard-sized cassette, according to exemplary embodiments of the subject disclosure.

FIGS. 8A-E show diffusion curves and projected completion times based on different threshold slope values, according to an exemplary embodiment of the subject disclosure.

DETAILED DESCRIPTION OF THE SUBJECT DISCLOSURE

I. Systems and Methods

Figure 1:
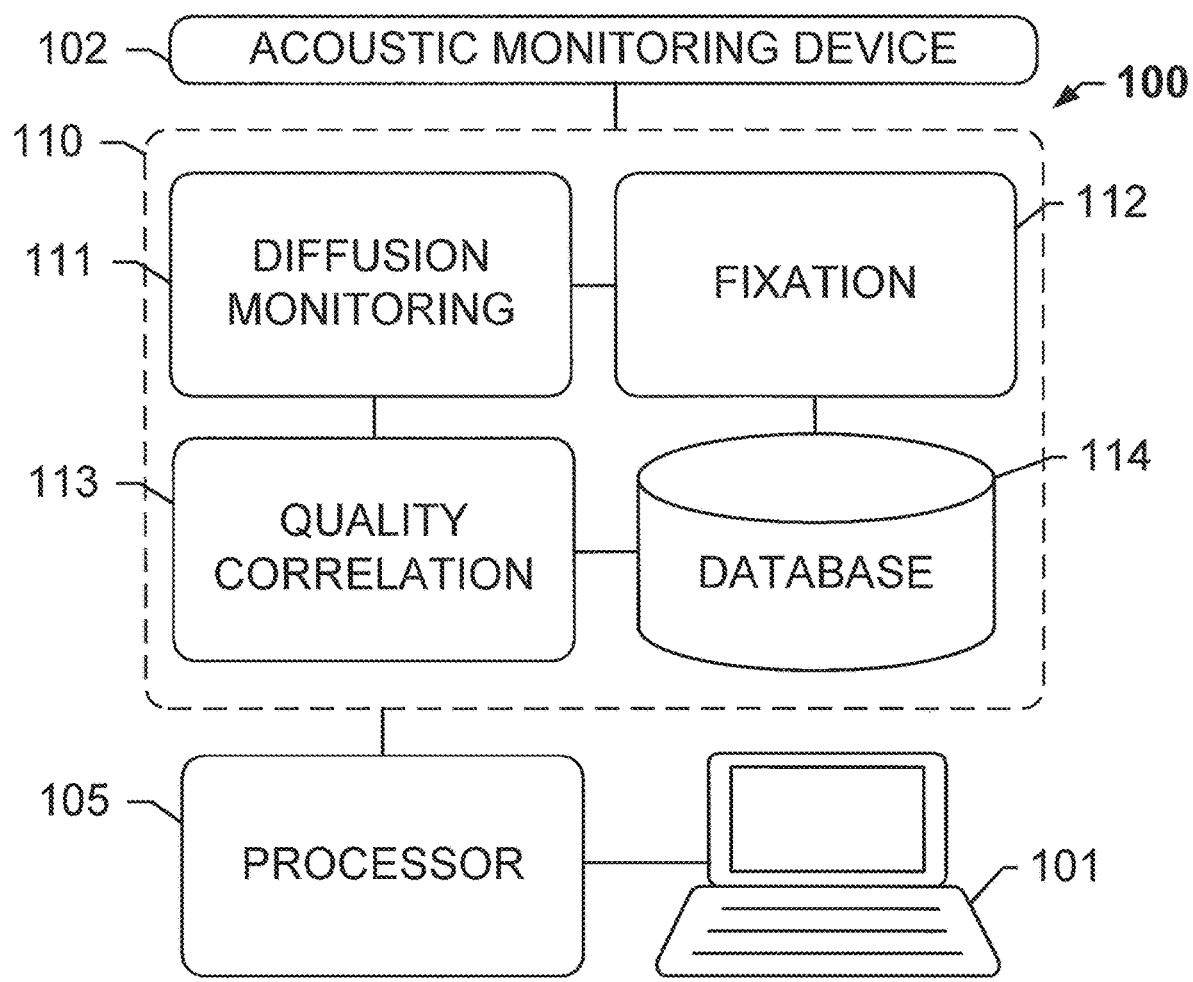
FIG. 1 shows a system for optimizing tissue fixation using diffusion monitoring, according to an exemplary embodiment of the subject disclosure.

The subject disclosure solves the above-identified problems by presenting systems and computer-implemented methods for predicting a minimum amount of time that a tissue sample is diffused with cold fixative in order to ensure optimal fixation and, therefore, high quality staining for downstream assays. The prediction is enabled by monitoring the penetration of fixative into several tissue samples, and correlating the rate of diffusion with a stain quality of the subsequent assay to determine the minimum time for diffusion resulting in an optimally-fixed tissue sample. The monitoring is based on changes in the speed of sound caused by diffusion of fixative into the tissue sample. As fixative penetrates into tissue, it displaces interstitial fluid. This fluid exchange slightly changes the composition of the tissue volume because interstitial fluid and the fixative have discrete sound velocities. An ultrasound pulse passing through the tissue sample thus accumulates a small time of flight (TOF) differential that increases as more fluid exchange occurs. The subject disclosure therefore discloses systems and methods for dynamically tracking and quantifying fixative diffusion by tracking TOF and correlating TOF to a rate of diffusion. By correlating particular rates of diffusion correlated with staining results, a metric can be developed to determine precisely when a sample has sufficient fixative penetration to stain well. This predictive metric is validated with results from a large tissue collection study. Experimental results are shown that confirm that this metric ensures ideally-stained cross-sections.

IA. Signal Analyzer

In an embodiment, a system for calculating diffusion metrics based on TOF is provided, said system comprising a signal analyzer containing a processor and a memory coupled to the processor, the memory to store computer-executable instructions that, when executed by the processor, cause the processor to perform operations including calculation of a rate of diffusion based on TOF calculations.

The term "processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

IB. Rate of Diffusion Calculation

The operations performed by the processor of the signal analyzer comprise calculation of a rate of diffusion. In order to calculate the rate of diffusion, a TOF trace (discussed in more detail below) is fit to a single exponential curve to derive a TOF decay amplitude (A) and decay constant (r). In some embodiments, the single exponential curve is of the form according to Equation I:

$$\text{TOF}(t,r) = C(r) + Ae^{-t/\tau(r)} \tag{I},$$

wherein C is a constant offset, A is the amplitude of the decay (i.e., the TOF value difference between the undiffused and fully diffused tissue sample), $\tau$ is the decay constant, t is the diffusion time, and r is the spatial dependence (which is explicitly stated). According to embodiments, the constant offset C represents the TOF difference between the tissue sample and a bulk solution (e.g. a tissue fluid or a sample buffer). The constant C may be set to zero for visualization (see e.g. the TOF starting values "zero" in FIGS. 3B and C). Where TOF calculations are made at a plurality of spatial locations, it may be desirable to calculate a spatially averaged TOF trace (i.e. a single curve representing TOF at a plurality of spatial locations within the sample) and to obtain an average TOF amplitude ($A_{avg}$) and an average decay constant ($\tau_{avg}$) by fitting the spatially averaged TOF trace to a single exponential curve. In some embodiments, the spatially averaged TOF trace is fit to a single exponential curve of the form according to Equation II:

$$TOF_{avg}(t) = \sum_{r=1}^{N} TOF(t, r) = C_{avg} + A_{avg} e^{-t/\tau_{avg}}, \tag{II}$$

wherein $TOF_{avg}$ is the spatially-averaged TOF trace, N is the number of spatial locations at which a TOF trace was acquired, $C_{avg}$ is the average constant offset, $A_{avg}$ is the average amplitude of the decay (i.e., the average TOF value difference between the undiffused and fully diffused tissue sample), and $\tau_{avg}$ is the average decay constant. Thus, "average" in this context means "spatial average" having been derived from data values obtained for a particular, shared time point at different points in the sample. The rate of diffusion at time t is calculated as a derivative of the single exponential curve at time t. In an embodiment, the rate of diffusion for a non-spatially averaged TOF trace is calculated according to the Equation IIIa:

$$\frac{dTOF(t)}{dt(t=t_o)} = \frac{-A}{\tau} e^{-t_o/\tau}, \quad \text{(IIIa)}$$

wherein A is the amplitude of the decay (i.e., the TOF value difference between the undiffused and fully diffused tissue sample), $\tau$ is the decay constant, and $t_0$ is the diffusion time. In another embodiment, the rate of diffusion for a spatially averaged TOF trace is calculated according to Equation IIIb:

$$\frac{dTOF(t)}{dt(t=t_o)} = \frac{-A_{avg}}{\tau_{avg}} e^{-t_o/\tau_{avg}}, \quad \text{(IIIb)}$$

wherein $A_{avg}$ is the average amplitude of the decay (i.e., the spatial average of the TOF difference between undiffused and fully diffused tissue sample), $\tau_{avg}$ is the average decay constant, and $t_0$ is the diffusion time. In some embodiments, the rate of diffusion calculated as an amplitude-normalized rate of diffusion by dividing the derivative of the curve by the sample's amplitude (A or $A_{avg}$) at time $t_0$. In an embodiment, the amplitude-normalized rate of diffusion is calculated for a non-spatially averaged TOF trace according to Equation IVa:

$$\dot{m}(t=t_o) = 100\left(\frac{-1}{\tau}e^{-t_o/\tau}\right), \left[\frac{\%}{\text{time}}\right], \quad \text{(IVa)}$$

wherein $\tau$ is the decay constant, $t_0$ is the diffusion time, and the brackets indicate the units for rate of diffusion, wherein time is the units of time according to $\tau$. In another embodiment, the amplitude-normalized rate of diffusion is calculated for a spatially averaged TOF trace according to Equation IVb:

$$\dot{m}(t=t_o) = 100\left(\frac{-1}{\tau_{avg}}e^{-t_o/\tau_{avg}}\right), \left[\frac{\%}{\text{time}}\right], \quad \text{(IVb)}$$

wherein $\tau_{avg}$ is the average decay constant, $t_0$ is the diffusion time, and the brackets indicate the units for rate of diffusion, wherein time is the units of time according to $\tau_{avg}$.

IC. TOF Calculation

In some embodiments, the TOF trace is pre-calculated and loaded directly into the signal analyzer. In other embodiments, the operations performed by the processor of the signal analyzer may further include converting an acoustic data set obtained by transmitting an ultrasonic signal through a tissue sample at a plurality of time points to a TOF trace. As used herein, the phrase "TOF trace" refers to a data set comprising a plurality of TOF measurements taken at discrete time points.

TOF typically is not directly recorded, but instead is estimated by comparing the phase of transmitted and received acoustic waves. In practice, an experimental frequency sweep is transmitted by a transmitter through the medium and detected by a receiver. The phase of the transmitted and received waves is compared and transformed to a temporal phase shift. A simulation is then run to model candidate temporal phase shifts at a variety of candidate TOFs, and an error between the candidate and experimental temporal phase shifts is generated and plotted as an error function. The TOF resulting in the minimum of the error function is selected as the "observed" TOF. Thus, in an embodiment, TOF is calculated by recording a transmitted phase shift between a transmitted and received ultrasound signal and by fitting the recorded phase shift to a plurality of simulated phase shifts at different candidate TOFs.

According to some embodiments, the TOF signal is determined highly accurately in accordance with one of the approaches disclosed in the international patent application entitled ACCURATELY CALCULATING ACOUSTIC TIME-OF-FLIGHT filed on Dec. 17, 2015 the content of which is hereby incorporated by reference in its entirety. The TOF may also be determined as disclosed in U.S. Provisional Patent Application No. 62/093,173, filed on Dec. 17, 2014, the content of which is hereby incorporated by reference in its entirety.

In some cases, the TOF trace may be recorded at a single point in the tissue sample (for example, at or near the geometric center of the tissue sample). In other cases, a TOF trace may be captured at a plurality of positions within the tissue sample.

As an example of TOF calculation, a post-processing algorithm has been developed that is capable of robustly detecting subnanosecond TOF values in tissue samples immersed in fixative solution. A transmitting transducer programmed with a programmable waveform generator transmits a 3.7 MHz sinusoidal signal for 600 µs. That pulse train is detected by a receiving transducer after traversing the fluid and tissue, and the received and transmitted US sinusoids are then compared electronically with a digital phase comparator. The output of the phase comparator is queried with an analog to digital converter and the average recorded. The process is repeated at multiple acoustic frequencies (v). Given the central frequency (4.0 MHz) and fractional bandwidth (~60%) of the transducers, a typical sweep ranges from 3.7-4.3 MHz with the phase comparator queried every 600 Hz. The voltage from the phase comparator is converted to a temporal phase shift, referred to as the experimentally determined phase ($\varphi_{exp}$). Next a brute force simulation is used to calculate what the observed phase frequency sweep would look like for different TOF values. Candidate temporal phase values, as a function of input sinusoid frequency, are calculated according to Equation V:

$$\varphi_{cand}(TOF_{cand}, v) = \left|TOF_{cand} - rnd\left(\frac{TOF_{cand}}{T(v)}\right)T(v)\right|, \quad \text{(V)}$$

where $TOF_{cand}$ is a candidate TOF value in nanoseconds, T is the period of the input sinusoid in nanoseconds, rnd represents the round to the nearest integer function, and | . . . | is the absolute value symbol. For a given candidate TOF and frequency value (i.e. period), the term on the right represents how long it takes for the nearest number of cycles to occur. This value is subtracted from $TOF_{cand}$ to calculate the temporal phase, into or up to, the next complete cycle. Phase values are thus computed for multiple candidate TOF values initially ranging from 10-30 μs with 200 ps spacing. The error between experimental and candidate frequency sweeps is calculated in a least-squares sense for individual candidate TOF values by Equation VI:

$$\text{Error}(TOF_{cand}) = \sum_{v=1}^{N} (\varphi_{cand}(TOF_{cand}, v) - \varphi_{exp}(v)), \quad \text{(VI)}$$

where N is the total number of frequencies in the sweep. The normalized error function, as a function of candidate TOF, resembles an optical interferogram. For example, each feature has a width of one acoustic period (T=¼ MHz=250 ns). Maximum error function indicates the candidate phase frequency sweep has equal wavelength but is out of phase with the experimental phase frequency sweep. Conversely, when error is minimized the two are completely harmonized and thus the reconstructed TOF is registered as the global minimum of the error function according to Equation VII:

$$TOF_{recon} = \underset{TOF_{cand}}{\text{argmin}}(\text{Error}). \quad \text{(VII)}$$

This technique of digitally comparing acoustic waves results in high precision due to the sharpness of the center trough, and results in exceptionally well-matched candidate and experimental phase frequency sweeps.

Additionally, a TOF trace recorded through the fixative solution only (i.e. that does not encounter the tissue sample) may be used to compensate for fluctuations in the recorded TOF as a result of environmental fluctuations (such as changes in temperature). A TOF trace that has been adjusted in this manner is referred to as a reference-compensated TOF trace. Thus, in a further embodiment, the TOF trace that is fit to the single exponential curve is a reference-compensated TOF trace.

ID. Acoustic Monitoring System

The system may also comprise an acoustic monitoring system adapted to generate the acoustic data set by transmitting an acoustic signal so that the acoustic signal encounters the tissue sample immersed in fixative solution, and then detecting the acoustic signal after the acoustic signal has encountered the tissue sample. Thus, in a further embodiment, a system is provided comprising a signal analyzer as disclosed herein and an acoustic monitoring system discussed in further detail below. Additionally or alternatively, a system may be provided comprising a signal analyzer as disclosed herein and a non-transitory computer readable medium comprising an acoustic data set obtained from an acoustic monitoring system as disclosed herein. In an embodiment, the acoustic data is generated by a frequency sweep transmitted and received by the acoustic monitoring system. As used herein, the term "frequency sweep" shall refer to a series of acoustic waves transmitted at fixed intervals of frequencies through a medium, such that a first set of acoustic waves is emitted through the medium at a fixed frequency for a first fixed duration of time, and subsequent sets of acoustic waves are emitted at fixed frequency intervals for subsequent—preferably equal—durations.

In an embodiment, an acoustic monitoring system for collecting the acoustic data set is provided, said acoustic monitoring system comprising a transmitter and a receiver, wherein said transmitter and receiver are arranged such that acoustic signals generated by the transmitter are received by the receiver and transformed into a computer-readable signal. In an embodiment, the system comprises an ultrasonic transmitter and an ultrasonic receiver. As used herein, a "transmitter" is a device capable of converting an electrical signal to acoustic energy, and an "ultrasonic transmitter" is a device capable of converting an electrical signal to ultrasonic acoustic energy. As used herein, a "receiver" is a device capable of converting an acoustic wave to an electrical signal, and an "ultrasonic receiver" is a device capable of converting ultrasonic acoustic energy to an electrical signal."

Certain materials useful for generating acoustic energy from electrical signals are also useful for generating electrical signals from acoustic energy. Thus, the transmitter and receiver do not necessarily need to be separate components, although they can be. The transmitter and receiver are arranged such that the receiver detects acoustic waves generated by the transmitter after the transmitted waves have encountered a material of interest. In some embodiments, the receiver is arranged to detect acoustic waves that have been reflected by the material of interest. In other embodiments, the receiver is arranged to detect acoustic waves that have been transmitted through the material of interest. In some embodiments, at least two sets of transmitters and receivers are provided, at least one of the sets positioned to transmit an acoustic signal through the fixative solution and the tissue sample, and at least a second positioned to transmit an acoustic signal through the fixative solution, but not through the tissue sample. In this embodiment, the first set is used to measure TOF changes in the tissue sample, and the second set is used to detect changes in TOF through the fixation solution (for example, changes resulting from environmental fluctuations, such as temperature).

In an embodiment, the transmitter comprises a waveform generator operably linked to a transducer, the waveform generator for generating an electrical signal that is communicated to the transducer, the transducer for converting the electrical signal to an acoustic signal. In certain embodiments, the waveform generator is programmable, such that a user may modify certain parameters of the frequency sweep, including for example: starting and/or ending frequency, the step size between frequencies of the frequency sweep, the number of frequency steps, and/or the duration for which each frequency is transmitted. In other embodiments, the waveform generator is pre-programmed to generate one or more pre-determined frequency sweep patterns. In other embodiments, the waveform generator may be adapted to transmit both pre-programmed frequency sweeps and customized frequency sweeps. The transmitter may also contain a focusing element, which allows the acoustic energy generated by the transducer to be predictably focused and directed to a specific area.

In operation, the transmitter transmits a frequency sweep through the medium, which is then detected by the receiver and transformed into the acoustic data set to be stored in a non-transitory computer readable storage medium and/or transmitted to the signal analyzer for analysis. Where the acoustic data set includes data representative of a phase difference between the transmitted acoustic waves and the received acoustic waves, the acoustic monitoring system may also include a phase comparator, which generates an electrical signal that corresponds to the phase difference between transmitted and received acoustic waves. Thus, in certain embodiments, the acoustic monitoring system comprises a phase comparator communicatively linked to a transmitter and receiver. Where the output of the phase comparator is an analog signal, the acoustic monitoring system may also include an analog to digital converter for converting the analog output of the phase comparator to a digital signal. The digital signal may then be recorded, for example, on a non-transitory computer readable medium, or may be communicated directly to the signal analyzer for analysis.

IE. Active Diffusion Monitoring System

In some embodiments, the system is adapted for active monitoring of diffusion of a fixative solution into the tissue sample. In such an embodiment, a system may be provided comprising: (a) an acoustic monitoring system as discussed herein and/or a non-transitory computer readable medium comprising an acoustic data set generated by said acoustic monitoring system; (b) a signal analyzer as discussed herein adapted to obtain the acoustic data set from the acoustic monitoring system and/or the non-transitory computer readable storage medium; and (c) an apparatus for holding a volume of a fixative solution in which the tissue sample can be immersed.

In embodiments in which a TOF trace is collected form a plurality of positions within the tissue sample, an apparatus may be provided for translating the tissue sample relative to the transmitter and receiver or translating the transmitter and receiver relative to the tissue sample, such that the common foci of the transmitter and receiver moves to different positions on the tissue sample. Additionally or alternatively, the acoustic monitoring system may be fitted with a plurality of transmitters and receivers, each of the plurality having a different common foci, such that each set captures a TOF trace at a different location within the tissue sample.

In some embodiments, the system further comprises a source of a fixative solution. In certain embodiments, the fixative is an aldehyde-based cross-linking fixative, such as glutaraldehyde- and/or formalin-based solutions. Examples of aldehydes frequently used for immersion fixation include:

formaldehyde (standard working concentration of 5-10% formalin for most tissues, although concentrations as high as 20% formalin have been used for certain tissues);

glyoxal (standard working concentration 17 to 86 mM);

glutaraldehyde (standard working concentration of 200 mM).

Aldehydes are often used in combination with one another. Standard aldehyde combinations include 10% formalin+1% (w/v) Glutaraldehyde. Atypical aldehydes have been used in certain specialized fixation applications, including: fumaraldehyde, 12.5% hydroxyadipaldehyde (pH 7.5), 10% crotonaldehyde (pH 7.4), 5% pyruvic aldehyde (pH 5.5), 10% acetaldehyde (pH 7.5), 10% acrolein (pH 7.6), and 5% methacrolein (pH 7.6). Other specific examples of aldehyde-based fixative solutions used for immunohistochemistry are set forth in Table 1:

TABLE 1

| Solution | Standard Composition |
| --- | --- |
| Neutral Buffered Formalin | 5-20% formalin + phosphate buffer (pH ~6.8) |
| Formal Calcium | 10% formalin + 10 g/L calcium chloride |
| Formal Saline | 10% formalin + 9 g/L sodium chloride |
| Zinc Formalin | 10% formalin + 1 g/L zinc sulphate |
| Helly's Fixative | 50 mL 100% formalin + 1 L aqueous solution containing 25 g/L potassium dichromate + 10 g/L sodium sulfate + 50 g/L mercuric chloride |

TABLE 1-continued

| Solution | Standard Composition |
| --- | --- |
| B-5 Fixative | 2 mL 100% formalin + 20 mL aqueous solution containing 6 g/L mercuric chloride + 12.5 g/L sodium acetate (anhydrous) |
| Hollande's Solution | 100 mL 100% formalin + 15 mL Acetic acid + 1 L aqueous solution comprising 25 g copper acetate and 40 g picric acid |
| Bouin's Solution | 250 mL 100% formalin + 750 mL saturated aqueous picric acid + 50 mL glacial acetic acid |

In certain embodiments, the fixative solution is selected from Table 1. In some embodiments, the aldehyde concentration used is higher than the above-mentioned standard concentrations. For example, a high-concentration aldehyde-based fixative solution can be used having an aldehyde concentration that is at least 1.25-times higher than the standard concentration used to fix a selected tissue for immunohistochemistry with a substantially similar composition. In some examples, the high-concentration aldehyde-based fixative solution is selected from: greater than 20% formalin, about 25% formalin or greater, about 27.5% formalin or greater, about 30% formalin or greater, from TO30% to about 50% formalin, from about 25% to about 40% formalin, from about 27.5% to about 40% formalin, and from about 30% to about 40% formalin. As used in this context, the term "about" shall encompass concentrations that do not result in a statistically significant difference in diffusion at 4° C. as measured by Bauer et al., *Dynamic Subnanosecond Time-of-Flight Detection for Ultra-precise Diffusion Monitoring and Optimization of Biomarker Preservation*, Proceedings of SPIE, Vol. 9040, 90400B-1 (2014 Mar. 20).

In some embodiments, it is desirable to hold the fixative solution at a specific temperature or within a specific range of temperatures during at least a portion of the diffusion process (such as during a two-temperature fixation process as discussed in more detail below). In such a case, the apparatus for holding the volume of fixative may be adapted to maintain the fixative solution at the specific temperature or within the specific temperature range. Thus, for example, the apparatus may be insulated to substantially reduce heat transfer between the fixative solution and the surrounding environment. Additionally or alternatively, the apparatus may be configured with a heating or cooling device designed to hold the fixative solution in which the tissue sample is immersed at the specific temperature or within the specific temperature range.

In some embodiments, it may be desirable to ensure that the tissue has reached a threshold level of fixative penetration. In such an embodiment, the signal analyzer may be further programmed to include a threshold function, which analyzes whether a threshold rate of diffusion value has been reached to ensure a minimal quality of a particular end analysis. In an embodiment, the threshold values for the particular end analysis are determined by empirically determining diffusion times for a particular tissue sample type required for achieving the minimal quality of the particular end process, and correlating those empirically determined times with the rate of diffusion as calculated above. In some embodiments, the system continuously monitors diffusion until the threshold rate of diffusion is reached. In an alternative embodiment, diffusion monitoring may continue until TOF data is fit to a single exponential curve with a degree of confidence that exceeds a predetermined threshold. Once the confidence level is reached, a time to reach the threshold rate of diffusion is extrapolated from the single exponential curve (referred to hereafter as "time to completion"), which enables active monitoring of the rate of diffusion to be replaced with a timer. In an embodiment in which a TOF trace is measured at a single location, the time to completion may be calculated according to the Equation VIIIa:

$$t_{done}(\tilde{m}) = \tau \ln(|\tilde{m}_{thres}\tau|) \quad \text{(VIIIa)},$$

wherein $t_{done}$ is the time to completion, and the | . . . | symbol indicates the absolute value. In an embodiment in which a spatially-averaged TOF trace is used, the time to completion may be calculated according to the Equation VIIIb:

$$t_{done}(\tilde{m}) = -\tau_{avg} \ln(|\tilde{m}_{thres}\tau_{avg}|) \quad \text{(VIIIb)}$$

wherein $t_{done}$ is the time to completion, and the | . . . | symbol indicates the absolute value. In embodiments including a thresholding function, the system may further include a notification device that indicates when the threshold rate of diffusion is reached or predicted to have been reached. Additionally or alternatively, the system may include automated devices for further processing the tissue sample, which are activated after the threshold rate of diffusion is reached or predicted to be reached. In one specific example that may be useful in a two-temperature fixation protocol, the system may be adapted to change the temperature of the fixative solution in which the tissue sample is immersed after the diffusion threshold has been reach, for example (but not limited to): by activating a robotic mechanism that physically transfers the tissue sample from a volume of cold fixative to a volume of warm fixative; by activating a flushing mechanism to remove cold fixative solution from the apparatus and a filling mechanism that injects warm fixative solution into the apparatus for holding the volume of fixative solution; by activating a heating mechanism that increases the temperature of the fixative to a specific temperature or within a specific temperature range and/or holds the temperature of the fixative at the specific temperature or within the specific temperature range; by deactivating a cooling mechanism and allowing the temperature of the fixative solution to passively rise.

IF. Two-Temperature Fixation

In an embodiment, the forgoing diffusion monitoring systems and methods are used to run a two-temperature immersion fixation method on a tissue sample. As used herein, a "two-temperature fixation method" is a fixation method in which tissue is first immersed in cold fixative solution for a first period of time, followed by heating the tissue for the second period of time. The cold step permits the fixative solution to diffuse throughout the tissue without substantially causing cross-linking. Then, once the tissue has adequately diffused throughout the tissue, the heating step leads to cross-linking by the fixative. The combination of a cold diffusion followed by a heating step leads to a tissue sample that is more completely fixed than by using standard methods. Thus, in an embodiment, a tissue sample is fixed by: (1) immersing an unfixed tissue sample in a cold fixative solution and monitoring diffusion of the fixative into the tissue sample by monitoring TOF in the tissue sample using the systems and methods as disclosed herein (diffusion step); and (2) allowing the temperature of the tissue sample to raise after a threshold TOF has been measured (fixation step). In exemplary embodiments, the diffusion step is performed in a fixative solution that is below 20° C., below 15° C., below 12° C., below 10° C., in the range of 0° C. to 10° C., in the range of 0° C. to 12° C., in the range of 0° C. to 15° C., in the range of 2° C. to 10° C., in the range of 2° C. to 12° C., in the range of 2° C. to 15° C., in the range of 5° C. to 10° C., in the range of 5° C. to 12° C., in the range of 5° C. to 15° C. In exemplary embodiments, the temperature of the fixative solution surrounding the tissue sample is allowed to rise within the range of 20° C. to 55° C. during the fixation step.

Two-temperature fixation processes are especially useful for methods of detecting certain labile biomarkers in tissue samples, including, for example, phosphorylated proteins, DNA, and RNA molecules (such as miRNA and mRNA). See PCT/EP2012/052800 (incorporated herein by reference). Thus, in certain embodiments, the fixed tissue samples obtained using these methods can be analyzed for the presence of such labile markers. Thus in an embodiment, a method of detecting a labile marker is a sample is provided, said method comprising fixing the tissue according to a two-temperature fixation as disclosed herein and contacting the fixed tissue sample with an analyte binding entity capable of binding specifically to the labile marker, wherein diffusion of the cold fixative is monitored according to a method as disclosed herein. Examples of analyte-binding entities include: antibodies and antibody fragments (including single chain antibodies), which bind to target antigens; t-cell receptors (including single chain receptors), which bind to MHC:antigen complexes; MHC: peptide multimers (which bind to specific T-cell receptors); aptamers, which bind to specific nucleic acid or peptide targets; zinc fingers, which bind to specific nucleic acids, peptides, and other molecules; receptor complexes (including single chain receptors and chimeric receptors), which bind to receptor ligands; receptor ligands, which bind to receptor complexes; and nucleic acid probes, which hybridize to specific nucleic acids. For example, an immunohistochemical method of detecting a phosphorylated protein in a tissue sample is provided, the method comprising contacting the fixed tissue obtained according to the foregoing two-temperature fixation method with an antibody specific for the phosphorylated protein and detecting binding of the antibody to the phosphorylated protein. In other embodiments, an in situ hybridization method of detecting a nucleic acid molecule is provided, said method comprising contacting the fixed tissue obtained according to the foregoing two-temperature fixation method with a nucleic acid probe specific for the nucleic acid of interest and detecting binding of the probe to the nucleic acid of interest.

II. Examples

Experimental methods were used to determine the predictive metrics disclosed herein. These methods were performed using human tonsil tissue obtained fresh and unfixed on wet ice in biohazard bags. Samples of tonsil tissues of precise sizes were obtained by using tissue punches of either 4 or 6 mm in diameter (Such as Miltex #33-36). For cold+warm fixation, 6 mm tonsil cores were placed into 10% NBF (Saturated aqueous formaldehyde from Fisher Scientific, Houston, Tex., buffered to pH 6.8-7.2 with 100 mM phosphate buffer) previously chilled to 4° C. for either 3 or 5 hours. Samples were then removed and placed into 45° C. neutral buffer formalin (NBF) for an additional 1 hour to initiate crosslinking. After fixation, samples were furthered processed in a commercial tissue processor set to an overnight cycle and embedded into wax. 6 tonsil cores from each run were sectioned length wise and embedded cut side down in the mold. This multiblock arrangement allows for each of the 6 cores to be stained simultaneously. Samples were stained manually by first dewaxing the samples with xylene and then with graded ethanols and into deionized water. Hematoxylin was applied by dipping a rack of slides into Gill II hematoxylin (Leica Microsystems) for 3 minutes followed by extensive washes in deionized water. Slides were then submerged into Scott's Original Tap Water (Leica Microsystems) for 1 minute and extensively washed in deionized water. To transition to Eosin, racks of slides were submerged first into 70% ethanol then into Eosin Y (Leica Microsystems) for 2 minutes. Slides were washed extensively, at least 4× in 100% ethanol, equilibrated into xylene and coverslipped.

An exemplary tissue processing system 100 for optimizing tissue fixation using diffusion monitoring, according to an exemplary embodiment of the subject disclosure is shown at FIG. 1. System 100 comprises an acoustic monitoring device 102 communicatively coupled to a memory 110 for storing a plurality of processing modules or logical instructions that are executed by processor 105 coupled to computer 101. Acoustic monitoring device 102 may detect acoustic waves that have traveled through a tissue sample and may include one or more transmitters and one or more receivers. The tissue sample may be immersed in a liquid fixative while the transmitters and receivers communicate to detect time of flight (ToF) of acoustic waves. Processing modules within memory 110 may include logical non-transitory computer-readable instructions for enabling processor 105 to perform operations including a diffusion monitoring module 111 for monitoring the diffusion of a fixative through a tissue sample and evaluating the speed of an acoustic wave traveling through the tissue sample based on time of flight, a fixation module 112 for executing fixation protocols based on the measurements, a quality correlation module 113 for performing quality correlation for training purposes, and a database 114 for storing optimal diffusion times and other results in a database, along with other operations that potentially result in an output of quantitative or graphical results to a user operations computer 101. Consequently, although not shown in FIG. 1, computer 101 may also include user input and output devices such as a keyboard, mouse, stylus, and a display/touchscreen.

A system as illustrated in FIG. 1 was developed by retrofitting an acoustic monitoring device 102 onto a commercial dip-and-dunk tissue processor such as the Lynx II by Electron Microscopy Sciences®. A mechanical head designed using Solidworks® software was fit around and sealed to a standard reagent canister. An external vacuum system was provided to degas the bulk reagent as well as the contents of the cassette, including the tissue. A cassette holder designed for use with either a standard sized histological cassette such as CellSafe 5 by CellPath® or a biopsy capsule such as CellSafe Biopsy Capsules by CellPath® for smaller tissue samples may be utilized to securely hold the tissue to prevent the sample from slipping during the experiment. The cassette holder was attached to a vertical translation arm that would slide the cassette holder in one direction. The mechanical head was designed with two metal brackets on either side of the tissue cassette, with one bracket housing 5 transmitting transducers, and the other bracket housing 5 receiving transducers that are spatially aligned with their respective transmitting transducers. The receiving bracket also houses a pair of transducers oriented orthogonal to the propagation axis of the other transducers. After each acquisition the orthogonal sensors calculate a reference TOF value to detect spatiotemporal variations in the fluid that has a profound effect on sound velocity. Additionally, at the end of each 2D acquisition, the cassette may be raised up and a second reference acquisition acquired. These reference TOF values may be used to compensate for environmentally-induced fluctuations in the formalin.

Acoustic sensors in this exemplary acoustic monitoring device 102 include pairs of 4 MHz focused transducers such as the TA0040104-10 by CNIRHurricane Tech (Shenzhen) Co., Ltd.® that are spatially aligned, with a tissue sample being placed at their common foci. One transducer, designated the transmitter, may send out an acoustic pulse that traverses the coupling fluid (i.e. formalin) and tissue and is detected by the receiving transducer. Initially, the transmitting transducer can be programmed with a waveform generator such as the AD5930 by Analog Devices® to transmit a sinusoidal wave for several hundred microseconds. That pulse train may then be detected by the receiving transducer after traversing the fluid and tissue. Diffusion monitoring module 111 may be executed to compare the received ultrasound sinusoid and the transmitted sinusoid using, for instance, a digital phase comparator such as the AD8302 by Analog Devices. The output of the phase comparator yields a valid reading during the region of temporal overlap between the transmitted and received pulses. The output of the phase comparator is allowed to stabilize before the output is queried with an integrated analog to digital converter on the microcontroller, such as the ATmega2560 by Atmel®. The process may then be repeated at multiple acoustic frequencies across the bandwidth of the transducer to build up the phase relationship between the input and output sinusoids across a frequency range. This acoustic phase-frequency sweep is directly used to calculate the TOF using a post-processing algorithm analogous to acoustic interferometry and capable of detecting transit times with subnanosecond accuracy.

The speed of sound in fluid has a large temperature dependence (e.g. $\Delta t_{water} \approx 2.3$ ns/° C.·mm at 4° C.) that can greatly affect acoustic transit times especially because TOF is an integrated signal over the path length of the transducers. Over the course of an experiment relatively large variations in the total TOF are typically observed due largely to the effects of thermal fluctuations throughout the fluid. To compensate for these environmental fluctuations, the TOF may also be calculated through only formalin and this acquisition, referred to as the reference channel, and used to compensate for spatiotemporal thermal gradients in the fluid. However, the reference compensation scheme works best with relatively slow and low amplitude thermal transients in the fluid, so reagent temperature may be precisely controlled using a developed pulse width modulation (PWM) scheme on the cooling hardware. The PWM temperature control uses a proportional-integral-derivative (PID) based algorithm that regulates the temperature of the reagent tightly about the set point by making slight adjustments to the temperature in ~400 μs increments. The PWM algorithm was found to control the temperature of the fluid with a standard deviation of ~0.05° C. about the set temperature. This precise temperature control used in conjunction with reference compensation virtually eliminates all environmental artifacts from the calculated signal. Unfiltered TOF traces have a typical noise value of less than 1.0 nanosecond.

Diffusion monitoring therefore includes dynamically tracking and quantifying the formalin diffusion until the tissue is at complete osmotic equilibrium and no more diffusion takes place. As described herein, the rate of diffusion varies with organ type, tissue constants, spatial heterogeneity, temperature, placement in the cassette, etc. These factors are generally controlled for based on the description of the diffusion monitoring system described in U.S. Patent Publication 2013/0224791. Generally, formalin diffusion is highly correlated with a single exponential trend, where the time transient of the trend can be completely characterized by a decay constant as further described herein. Once the decay constant is reached, there is sufficient formaldehyde inside the tissue to guarantee quality staining. Using the measurements for each tissue sample, the diffusion is tracked at every position, and the region with the longest decay constant is correlated with an optimal result or an existing staining result. For training purposes or to compare with existing or known staining results, quality correlation module 113 may be invoked. Based on the results, a fixation module 112 may execute a fixation protocol as described herein, or any protocol based on a rule set that guarantees optimal fixation of the tissue sample.

FIGS. 2A and 2B respectively show depictions of ultrasound scan patterns from a biopsy capsule and from a standard-sized cassette, according to an exemplary embodiment of the subject disclosure. As described herein, the measurements from the acoustic sensors in an acoustic monitoring device may be used to track the change and rate of change of a ToF of acoustic signals through the tissue sample. This includes monitoring the tissue sample at different positions over time to determine diffusion over time or a rate of diffusion. To image all the tissue in the cassette, the cassette holder may be sequentially raised ≈1 mm vertically and TOF values acquired at each new position, as depicted in FIGS. 2A and 2B. The process may be repeated to cover the entire open aperture of the cassette. Referring to FIG. 2A, when imaging tissue in the biopsy capsule 220, signals are calculated from all 5 transducers pairs, resulting in the scan pattern depicted in FIG. 2A. Alternatively, when imaging tissue in the standard sized cassette 221 depicted in FIG. 2B, the 2nd and 4th transducer pairs may be turned off and TOF values acquired between the 1st, 3rd, and 5th transducer pairs located at the respective centers of the three middle subdivisions of the standard sized cassette 221. Two tissue cores may then be placed in each column, one on the top and one on the bottom as shown in FIG. 3A. This setup enables TOF traces from 6 samples (2 rows×3 columns) to simultaneously be obtained and significantly decreased run to run variation and increased throughput. In this exemplary embodiment, the full-width-half-maximum of the ultrasound beam is 2.2 mm.

As previously stated, the TOF in fluid is highly dependent on thermal fluctuations within the bulk media. To compensate for these deviations the reference TOF value may be subtracted from the TOF value obtained through the tissue and formalin to isolate the phase retardation from the tissue. When using the orthogonal reference sensors, a scaling factor may be used to adjust for the slight geometrical difference in spacing between these two sensors and the pairs of scanning sensors. The reference-compensated TOF traces resulting from active diffusion into tissue, from now on referred to simply as the TOF, are empirically determined to be highly correlated with a single-exponential curve of the form:

$$TOF(t,r) = C(r) + Ae^{-t/\tau(r)} \quad (I)$$

C is a constant offset in nanoseconds, A is the amplitude of the decay in nanoseconds (i.e., the TOF value difference between the undiffused and fully diffused tissue sample), $\tau$ is the decay constant in hours, and the spatial dependence (r) is explicitly stated. The signal amplitude denotes the magnitude of the diffusion and is thus directly proportional the cumulative amount of fluid exchange. The decay constant represents the time for the amplitude to decrease by 63% and is inversely proportional to the rate of formalin diffusion into the tissue (i.e. large decay constant=slowly diffusing). Due to the scanning capability of the system, multiple independent TOF signals can be acquired from each tissue sample.

FIGS. 3A-C show time-of-flight (ToF) traces and an average diffusion curve generated from a tissue sample in a standard-sized cassette, according to exemplary embodiments of the subject disclosure. As described herein, for each tissue sample, the diffusion is tracked at every position. FIG. 3A shows a standard sized cassette with 6 tissue samples placed inside. Samples may be cold soaked in 10% NBF. FIG. 3B displays signals acquired while imaging the 6 mm human tonsil tissue displayed in the green box in FIG. 3A. Each signal comes from a different spatial location within the tissue (Δy≈1 mm) corresponding to the colored-lines in the green box. Each trend may be fit to Eq. 1 using non-linear regression to study the spatial variation of the sample. The amplitude and decay constant values can be analyzed spatially for trends and further analysis. For example, large variability in both the decay rate and amplitude of the spatially-varying TOF signals can be seen in FIG. 3B. However, for the study depicted in this exemplary embodiment, each independent TOF signal was spatially averaged to calculated the gross TOF signal from the entire tissue according to the following equation:

$$TOF_{avg}(t) = \sum_{r=1}^{N} TOF(t, r) = C_{avg} + A_{avg}e^{-t/\tau_{avg}} \quad (II)$$

$TOF_{avg}$ is the spatially-averaged TOF signal difference between the undiffused and fully diffused tissue sample, N is the number of spatial locations a TOF signal was acquired at, $C_{avg}$ is the average (spatially averaged) constant offset in nanoseconds, $A_{avg}$ is the average amplitude of the decay in nanoseconds (i.e., the spatially averaged TOF obtained at time t=0, i.e., before diffusion of the reagent into the sample started), and $\tau_{avg}$ is the average decay constant in hours. For the averaged parameters the signal is spatially averaged and then fit to Eq. 1 using non-linear regression to determine these variables.

FIG. 3C depicts nine TOF traces averaged together to calculate the average TOF for the entire sample. This signal may be used to calculate the average decay constant ($\tau_{avg}$) and amplitude ($A_{avg}$) which are labeled on the figure. Spatially, averaging TOF signals was important to characterize the bulk properties of the tissue and also significantly improved the signal-to-noise ratio of the system. To mitigate spurious white noise in the reference-compensated TOF data, a $3^{rd}$ order Butterworth filter may be utilized. This filter preserves the low-frequency components of the exponential diffusion decay while removing high-frequency noise. Referenced to a single exponential decay, unfiltered TOF data has a typical root-mean-square-error (RMSE) of about 1 nanosecond, which was reduced to 200-300 picoseconds after filtering. For all statistical analyses in this embodiment, a two-tailed Student's t-test may be used to test for statistical significance between distributions of interest and p-values less than 0.1 (p<0.1) were considered significant.

Generally, diffusion of NBF into tissue sections is controlled mainly by concentration of formaldehyde and time. Since NBF is a fixed concentration of formaldehyde (3.7% W/V), a minimum exposure time to cold NBF can be presumed to produce excellent histomorphology. A time course experiment is depicted in FIG. 4A using 6 mm cores of human tonsil tissues submerged into 4° C. NBF followed by 1 hour in 45° C. NBF. After multiple experiments, it was determined that a minimum of 3 hours of cold NBF (3 hours cold+1 hour warm) can produce good histomorphology. Tissue morphology was slightly better after 5 hours (5+1). Multiple cores were then examined using both 3+1 and 5+1 protocols as verification.

Figure 4:
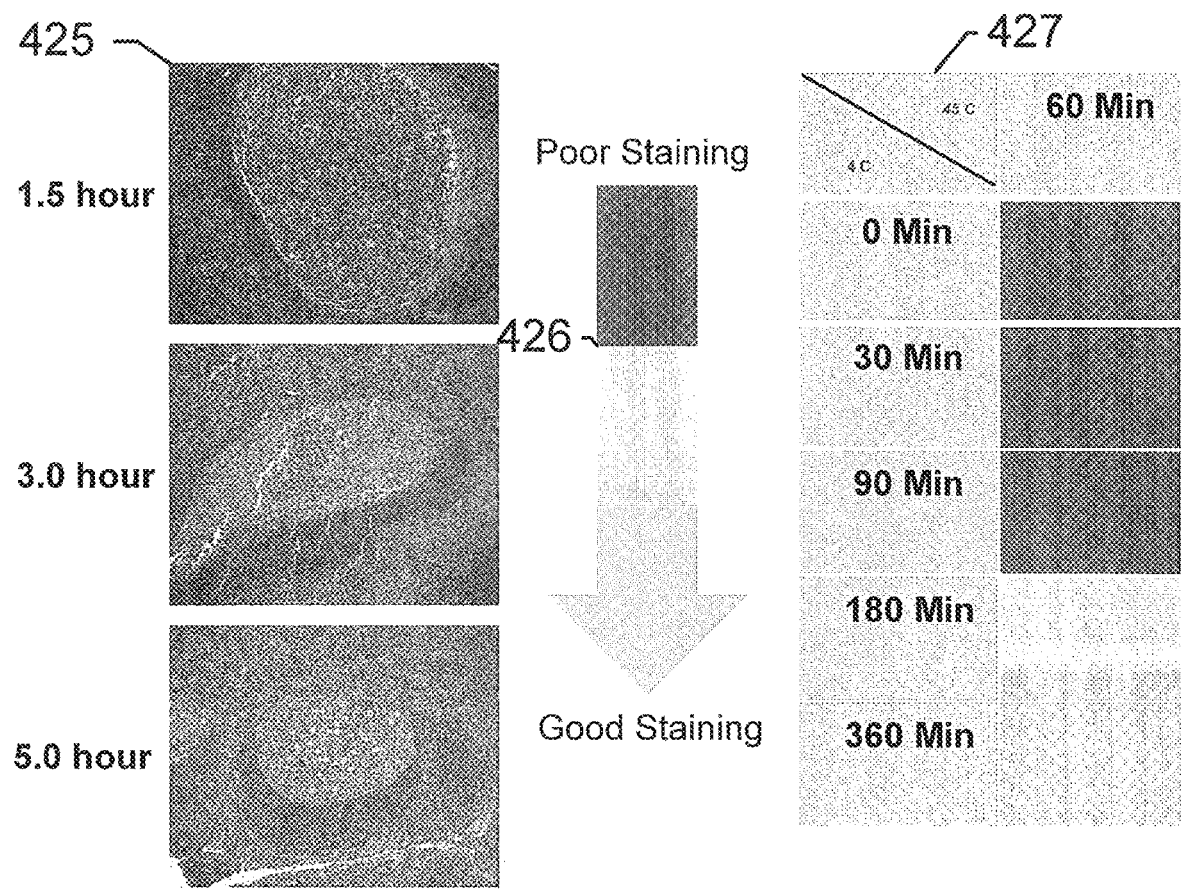
FIG. 4 shows a quality of tissue morphology for tissue samples fixed at different time intervals, according to an exemplary embodiment of the subject disclosure.

FIG. 4 shows a quality of tissue morphology for tissue samples fixed at different time intervals, according to an exemplary embodiment of the subject disclosure. On the left side are depicted human tonsil cores 425 fixed with a cold+warm protocol, with cold soak times as indicated. On the right side, a summary of multiple time course experiments 427 is color coded to indicate the quality of tissue morphology, with the arrow 426 indicating quality of tissue morphology using red (upper third of the arrow) to indicate poor quality, yellow (middle third of the arrow) to indicate adequate quality, and green (lower third of the arrow) to indicate good quality.

Therefore, the needed diffusion times have been shown to be empirically determined from downstream assay results. The diffusivity properties of human tonsil tissues may further be quantitatively characterized and validated. As described herein, each sample may be cored to be about 6 mm in diameter. Diffusivity findings may be correlated with the required amount of crosslinking agent throughout the specimen as detected with the TOF-based diffusion monitoring system described herein. For example, in one experiment, a total of 38 six mm human tonsil samples were imaged using TOF in cold (7±0.5° C.) 10% NBF. Of the 38 samples, 14 were monitored for 3 hours and the remaining 24 samples were scanned for 5 hours. For each sample the diffusion was measured throughout the sample in 1 mm intervals. The TOF curves from those scans were spatially averaged, according to Eq. 2, to produce the average diffusion curve of each respective sample. According to embodiments, the diffusivity constant of the sample may be determined via one of the approaches disclosed in international patent application entitled OBTAINING TRUE DIFFUSIVITY CONSTANT, filed Dec. 17, 2015, the contents of which are hereby incorporated by reference in its entirety.

Figure 5:
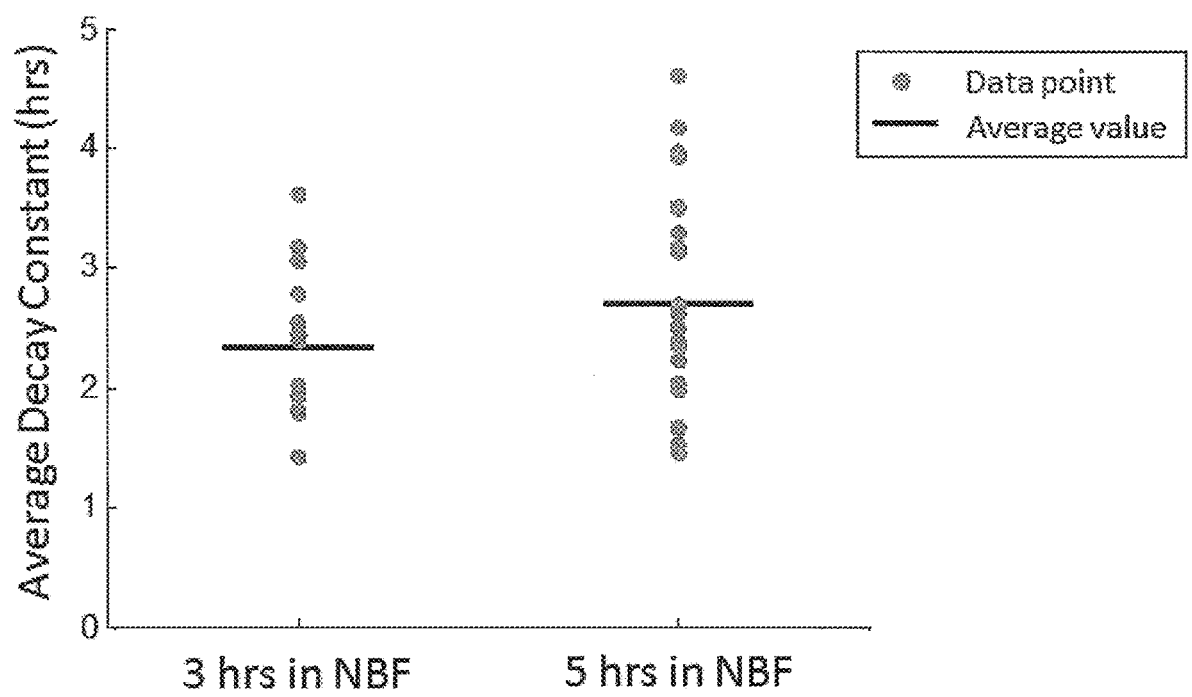
FIG. 5 shows a plot of the decay constants for tissue samples soaked for 3 and 5 hours, according to an exemplary embodiment of the subject disclosure.

FIG. 5 shows a plot of the decay constants for tissue samples soaked for 3 and 5 hours, according to an exemplary embodiment of the subject disclosure. The samples scanned for 3 hours and 5 hours had average diffusion decay constants of 2 hours and 20 minutes and 2 hours and 43 minutes, respectively. The difference of average decay constants of 23 minutes is relatively small (<15%) and was found to be statistically insignificant (p=0.15), indicating that the two datasets come from the same distribution and are therefore measuring the same physical phenomena. This establishes that the detection mechanism, when monitoring tissue for at least three hours, produces accurate and reproducible results. On average for the cumulative dataset, the average decay time of all 38 tonsil samples was 2 hours and 34 minutes (2.57 hours).

Having validated the diffusion monitoring system, the dataset of 38 six mm tonsil samples was analyzed to find a correlation between the diffusion properties of each sample and the known cold diffusion times required to produce ideal downstream staining results empirically determined in prior sections. Numerous analytic techniques may be employed, including multivariate analysis, cluster based algorithms, characterizing the derivative of the signal, and principal component analysis. A slope base analysis provides meaningful discrimination of samples in cold formalin for 3 hours versus 5 hours, i.e. samples that are stained adequately versus those that would stain ideally throughout the sample. However, the derivative of the TOF signal as calculated from a linear-regression based on a series of TOF points may be noisy and, to significantly mitigate noise and more accurately represent the active rate of diffusion, the derivative of the TOF signal may be calculated based on a fit to a single exponential function.

Formally, the derivative of each sample's single-exponential TOF curve has the form $$\frac{dTOF(t)}{dt(t=t_o)} = \frac{-A_{avg}}{\tau_{avg}} e^{-t_o/\tau_{avg}}, \left[\frac{ns}{hr}\right] \tag{IIIb}$$

TOF(t) is the time-dependent TOF signal, $t_o$ is the time the derivative is taken at (i.e. the amount of time in cold formalin), $A_{avg}$ is the amplitude of the average diffusion decay signal (i.e., the average TOF value difference between the undiffused and fully diffused tissue sample), $\tau_{avg}$ is the average decay constant, d/dt is the time derivative, and the brackets denote the units of the TOF slope which are nanoseconds of TOF per hour of diffusion. Eq. 3 may be used to calculate the derivative of each sample, with results depicted in FIGS. 6A and 6B.

Figures 6A, 6B:
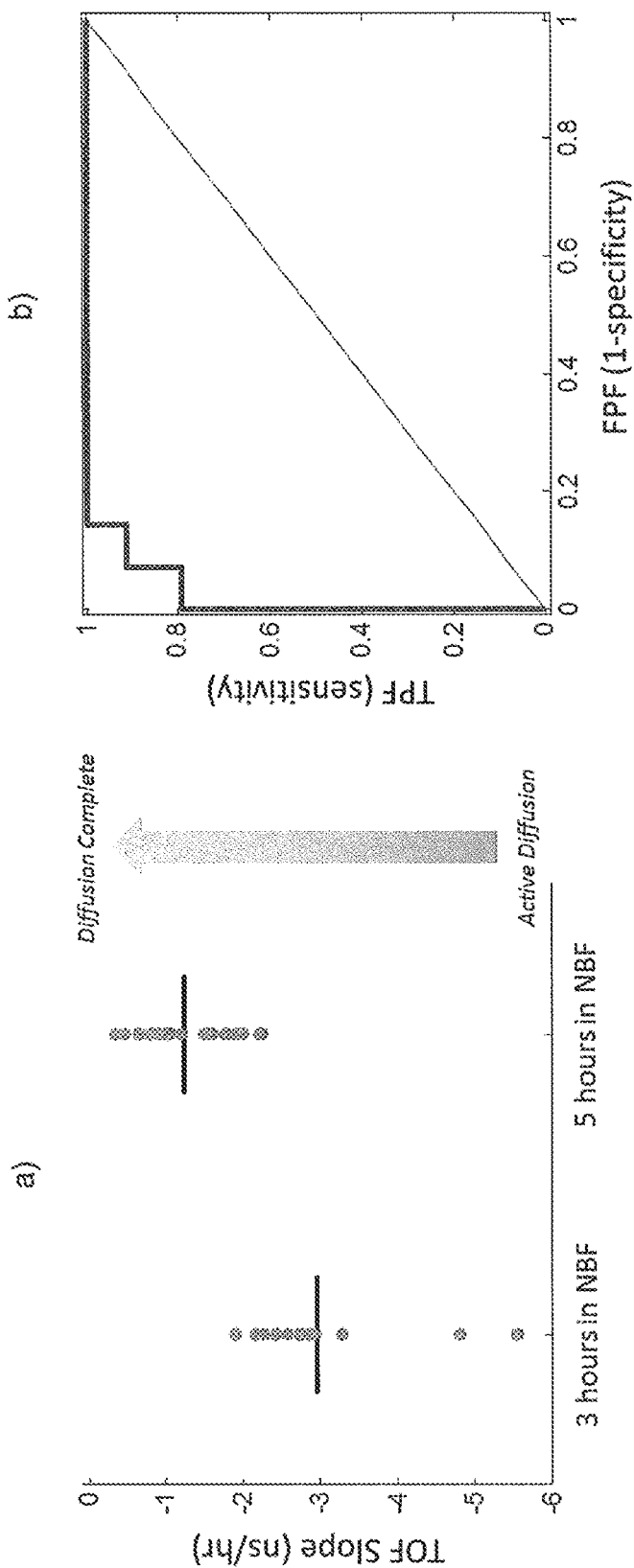
FIGS. 6A and 6B show diffusion curves and receiver operating characteristic curves for a plurality of samples, according to an exemplary embodiment of the subject disclosure.

FIGS. 6A and 6B show diffusion curves and receiver operating characteristic curves for a plurality of samples, according to an exemplary embodiment of the subject disclosure. FIG. 6A shows a slope of each sample's diffusion curve taken either after 3 hours (Left) or 5 hours (Right) of cold diffusion. The average rate of diffusion at 3 hours and 5 hours was −2.96 ns/hr and −1.26 ns/hr, respectively, meaning the rate of diffusion had slowed ~135% over this two hour period. This represents a large difference in average rates of diffusion that was found to be statistically significant (p<2e-6). FIG. 6B shows the receiver operating characteristic (ROC) curve of sample rate of diffusion with an area-under-the-curve (AUC) of 0.98, which indicates very high, but not perfect, differentiation of the two datasets based on the derivative of their TOF curves. In FIG. 6B, TPF represents a true positive fraction and FPF represents a false positive fraction.

To provide more conclusive evidence, the effects from TOF signals of different amplitudes were mitigated by normalizing each signal by its amplitude. It was found that optimal discrimination was achieved via the time-dependent TOF signals normalized by their average amplitude according to the equation:

$$\tilde{m}(t=t_o) = 100 \left(\frac{-1}{\tau_{avg}} e^{-t_o/\tau_{avg}}\right), \left[\frac{\%}{hr}\right] \tag{IVb}$$

Figures 7A, 7B:
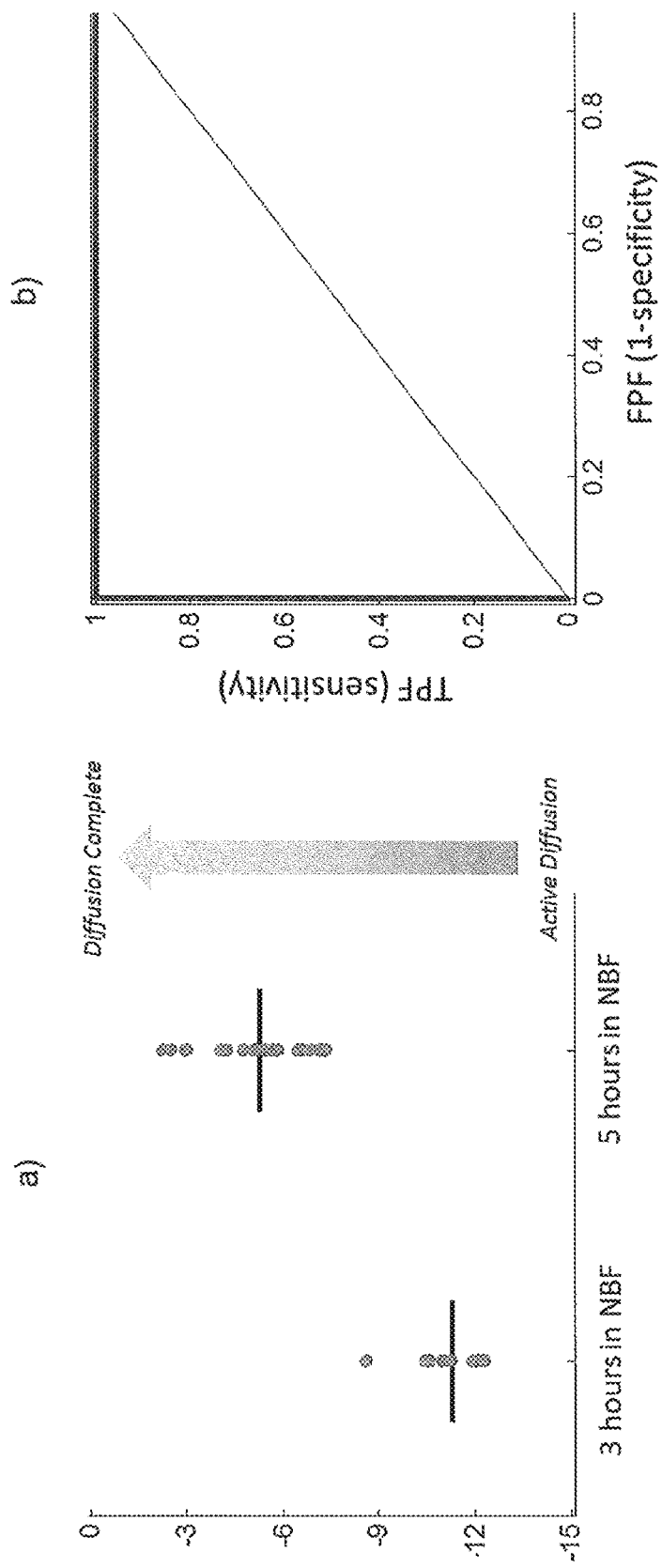
FIGS. 7A and 7B show an amplitude-normalized slope of the diffusion curves and receiver operating characteristic curves for a plurality of samples, according to an exemplary embodiment of the subject disclosure.

In this equation, hereinafter referred to as Eq. 4, $\tilde{m}(t=t_o)$ is the derivative of the TOF signal at $t_o$ divided by the sample's average amplitude and the brackets denote the units of the amplitude-normalized TOF slope which are percent TOF change per hour of diffusion. FIGS. 7A and 7B show amplitude-normalized slope of the diffusion curves and receiver operating characteristic curves for a plurality of samples, according to an exemplary embodiment of the subject disclosure. FIG. 7A displays the normalized slope, at 3 and 5 hours respectively, of each sample from both datasets. The slope of the diffusion curve represents the active rate of diffusion of formalin into the tissue. As expected, samples that were in formalin for only 3 hours experience a much larger rate of active diffusion of −11.3%/hr whereas after 5 hours the rate of diffusion has significantly slowed to an average rate of −5.3%/hr, with several samples approaching full osmotic equilibrium as indicated by a near zero rate of diffusion. The different distributions of normalized rates of diffusion at 3 and 5 hours were highly statistically significant (p<2e-15), indicating a drastic and physically real difference in the rate of diffusion at 3 versus 5 hours.

To evaluate how reliably the groups can be separated an ROC analysis was completed with results displayed in FIG. 7B. From this figure it can be seen that the normalized rate of diffusion well distinguishes the two datasets. The AUC was calculated to be exactly 1.0, indicating perfect discrimination of samples that will stain decent and samples that will stain pristinely based on their normalized rate of formalin diffusion. This result seems appropriate because as samples reach osmotic equilibrium with the external formalin, their internal concentration of formaldehyde will be high resulting in an arrested rate of diffusion. In other words, the two groups of samples can be perfectly distinguished based on the slope of their TOF diffusion curves. Therefore, it stands to reason that the rate of formal diffusion and stain quality would be highly correlated.

From these results, it is apparent that the rate of formalin diffusion and stain quality are highly correlated with clear differences from both metrics between samples analyzed at 3 and 5 hours. Given the correlative nature of these variables, Eq. IVb may be solved for the time required to reach a given normalized slope, resulting in the following equation:

$$t_{done}(\tilde{m}) = -\tau_{avg} \ln(|\tilde{m}_{thres} \cdot \tau_{avg}|) \quad \text{(VIIIb)}$$

$t_{done}$ is the time required for the signal's derivative to reach threshold slope, and the | . . . | symbol indicates the absolute value. For a given average decay constant, which may be sample specific, and normalized slope value, this equation can be used to calculate how long a sample needs to be in cold formalin before it will reach a given threshold slope value. To evaluate rate of diffusion as a stain-quality predictor, three threshold slope values ($m_{thres}$=−7.4, −8.0, −10.4%/hr) were chosen for evaluation, with large absolute slope values representing more fluid exchange per hour. Thus as a sample's active diffusion slows the rate of diffusion will approach osmotic equilibrium or 0%/hr. It therefore stands to reason that a larger threshold slope criterion will predict samples have adequate diffusion after less time.

This is illustrated graphically in FIGS. 8A-E on a representative 6 mm piece of human tonsil. FIGS. 8A-E show diffusion curves and projected completion times based on different threshold slope values, according to an exemplary embodiment of the subject disclosure. FIG. 8A shows the normalized slope of each sample's diffusion curve taken either after 3 hours (Left) or 5 hours (Right) of cold diffusion with different threshold slope values of −7.4, −8.0, −10.4%/hr indicated with green lines labeled 3, 2, and 1 respectively. FIG. 8B shows the average TOF signal from a 6 mm piece of tonsil with the approximate locations of the threshold slope values indicated on the graph. FIGS. 8C, D, and E show plots of the projected completion times for each of the three evaluated slope values labeled on each graph.

The summarized data from the three assessed threshold slope values is shown in Table 2 as follows:

TABLE 2

| Threshold Slope (%/hr) | −10.4 | −8.0 | −7.4 |
| Average Completion Time (hrs) | 3.27 | 3.94 | 4.14 |
| Samples Done in <3 hours | 6 | 0 | 0 |
| Minimum completion time (hrs) | 2.73 | 3.10 | 3.21 |
| Maximum completion time (hrs) | 3.54 | 4.60 | 4.96 |

Based on these findings, all samples may not have sufficient formalin to stain acceptably when their rate of diffusion is −10.4%/hr. The middle threshold slope value of −8.0%/hr (depicted in FIG. 8D) produces ideal discrimination between the two datasets and reasonable completion times between 3 and 5 hours. However, to be as conservative as possible, the lowest threshold slope value of −7.4%/hr (depicted in FIG. 8E) may be selected as the criterion for when samples will stain ideally throughout. With this conservative rate of diffusion metric, 6 mm tonsil cores are projected to take between 3.21 and 4.96 hours, which when compared to downstream histological staining proves to be reasonable and true. Based on these experiments and analysis, once a sample's real-time rate of normalized diffusion slows to at least: $\tilde{m}_{thres}(t) \leq -7.4\%/hr$ (equation 6), the sample must have sufficient formalin throughout to guarantee ideal and uniform histological staining.

Modern histological stains take place on a plethora of different types of tissues. It is therefore useful to characterize the diffusion properties of a number of different types of tissues. Therefore, the properties of several hundred samples (n=241) from 34 different tissue types were recorded with the disclosed diffusion monitoring system. Reliable trends were recorded from all sampled tissue types, indicating that the disclosed diffusion monitoring system is compatible with an assortment of different tissue types. Furthermore, all samples when monitored in cold 10% formalin had TOF diffusion curves that were highly correlated with a single-exponential function disclosed herein. For example, typically $R^2_{adj}$ were typically greater than 0.99 and the average RMSE for all samples, referenced to the fit, was only 0.535 ns representing an average deviation from the fit of about 1%.

Figure 9:
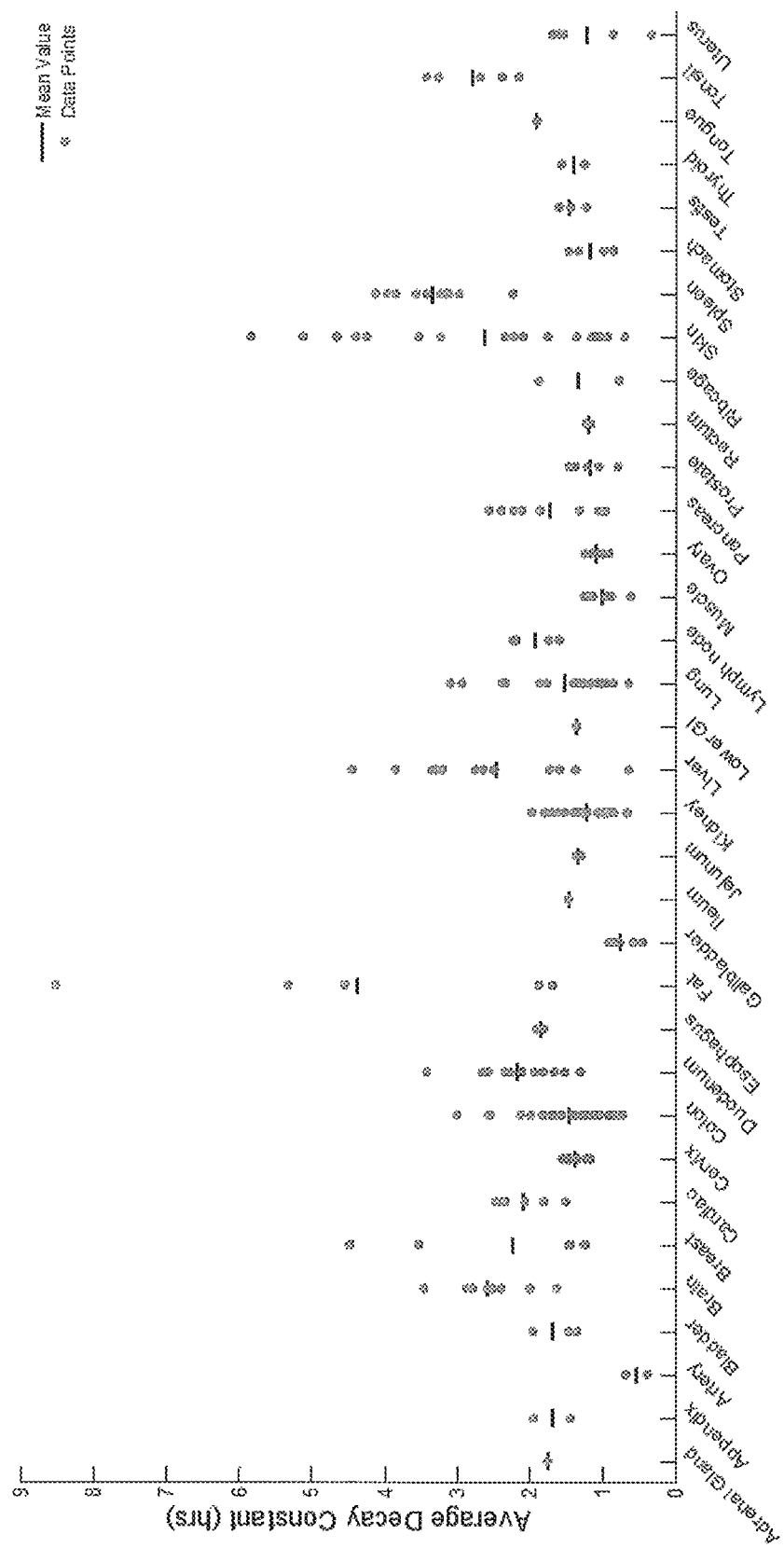
FIG. 9 shows average decay constants for a plurality of tissue samples plotted in alphabetical order, according to an exemplary embodiment of the subject disclosure.
Figure 10:
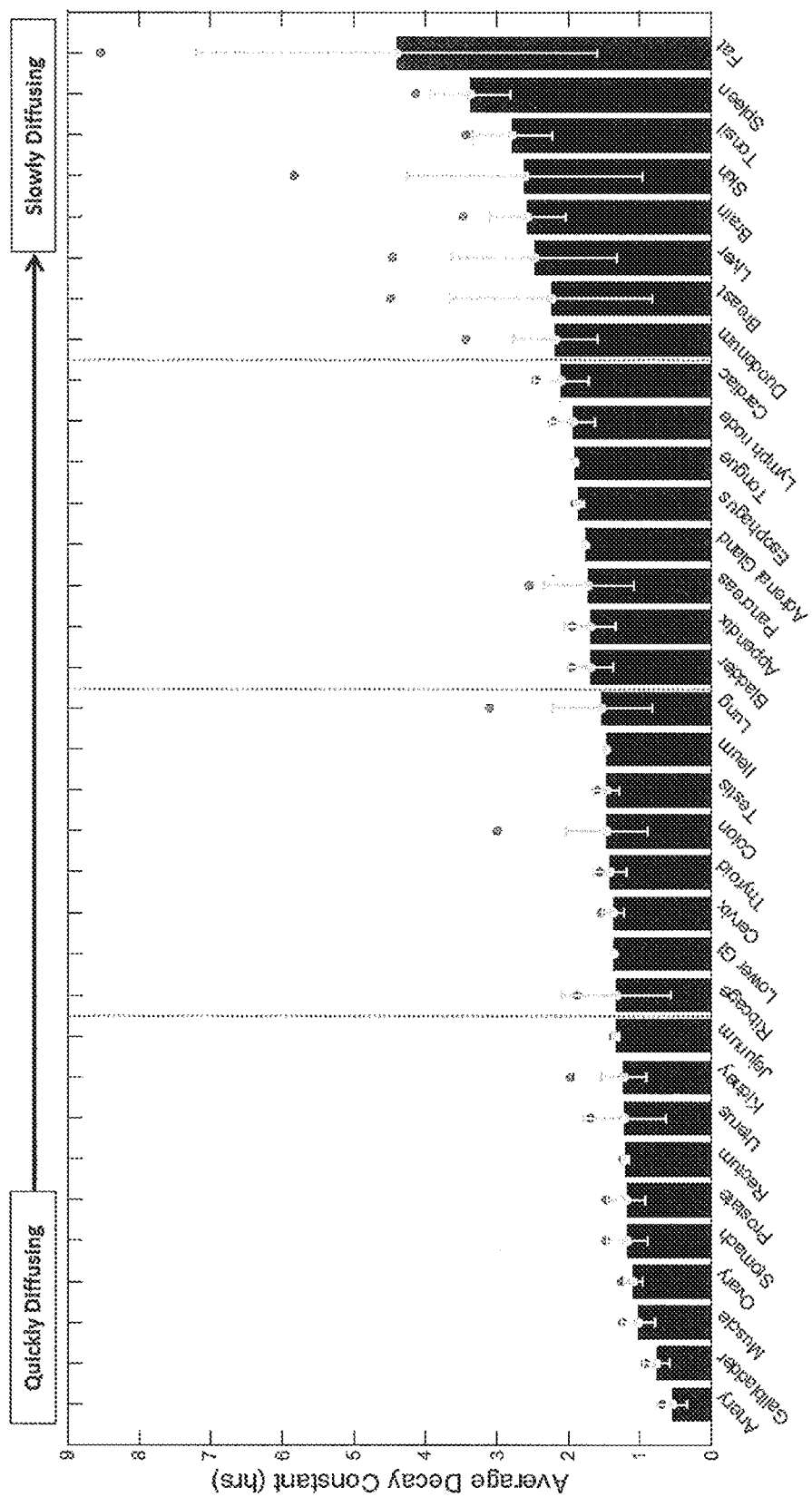
FIG. 10 shows average decay constants from each tissue sample averaged over organ type and sorted from lowest to highest decay constant, according to an exemplary embodiment of the subject disclosure.

FIG. 9 shows the average decay constants for a plurality of tissue samples cut to 5-7 mm thickness and plotted in alphabetical order, according to an exemplary embodiment of the subject disclosure. There is an extreme amount of variability in rate of formalin diffusion, even within individual tissue types, with several tissues' demonstrating minimum to maximum differences of multiple hours (e.g. breast, fat, liver, skin). Thus, embodiments of the invention take advantage of the observation that tissue is highly heterogeneous. Additionally, the average decay constant from each respective group varies significantly, indicating drastically different diffusion rates across different organs and types of tissues. Consequently, FIG. 10 shows average decay constants from each tissue sample averaged over organ type and sorted from lowest to highest decay constant, according to an exemplary embodiment of the subject disclosure. Displayed in this manner, more quickly diffusing tissues register to the left (i.e. smaller decay constants) and slowly diffusing tissues register to the right (i.e. larger decay constants). Importantly, several of the tissue types that the American Society of Clinical Oncology and the College of American Pathologists (ASCO/CAP) has recognized as needing extra time in formalin (e.g. breast, brain, fat) are located on the far right of the graph amongst the slowest quarter of tissues. Clearly, the disclosed TOF diffusion monitoring system has confirmed the ASCO/CAP guidelines of slowly diffusing tissues. These results provide a thorough characterization of key differences between the diffusivity properties of different types. Sorted in this fashion, it is clear that about 75% of organs have average decay constants of less than ~2 hours. Tissues with longer decay constants tend to have more variation in the spread of their decay rates.

Figure 11:
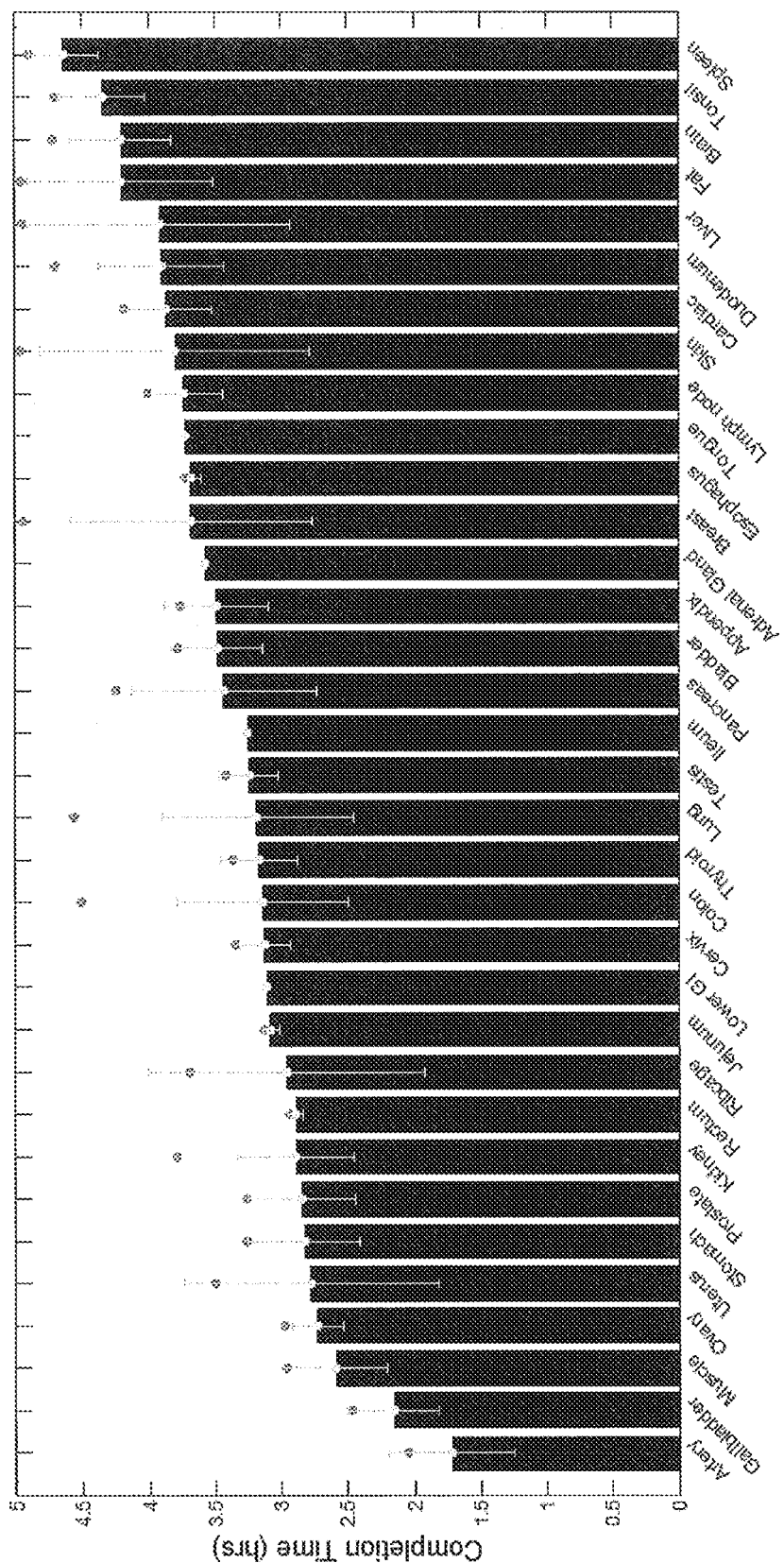
FIG. 11 shows projected completion times for different tissue types using a threshold slope of −7.4%/hr, according to an exemplary embodiment of the subject disclosure.

Based on the developed amplitude-normalized rate of diffusion metric, Eq. 5 may be used to calculate projected completion times for all the samples in the broad tissue collection study. FIG. 11 shows projected completion times for different tissue types using a threshold slope of −7.4%/hr, according to an exemplary embodiment of the subject disclosure. Results are sorted from lowest to highest calculated completion time, based on the conservative threshold slope value of −7.4%/hr. Red dots indicate maximum value and green whiskers indicate ±standard deviation of the group.

Figure 12B:
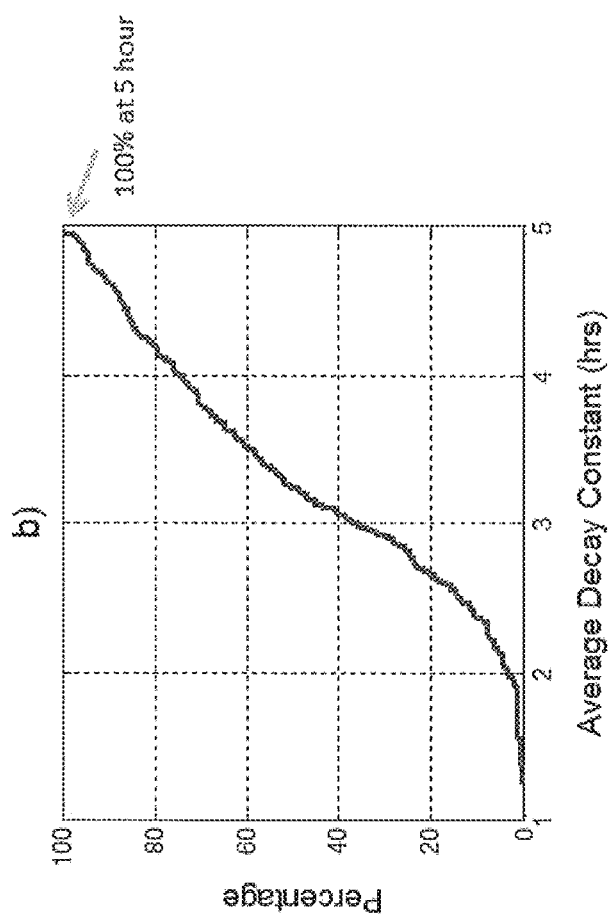
FIGS. 12A and 12B respectively show the probability density functions for projected completion times for a plurality of tissue types and a cumulative distribution function for all completion times, according to an exemplary embodiment of the subject disclosure.
Figure 12A:
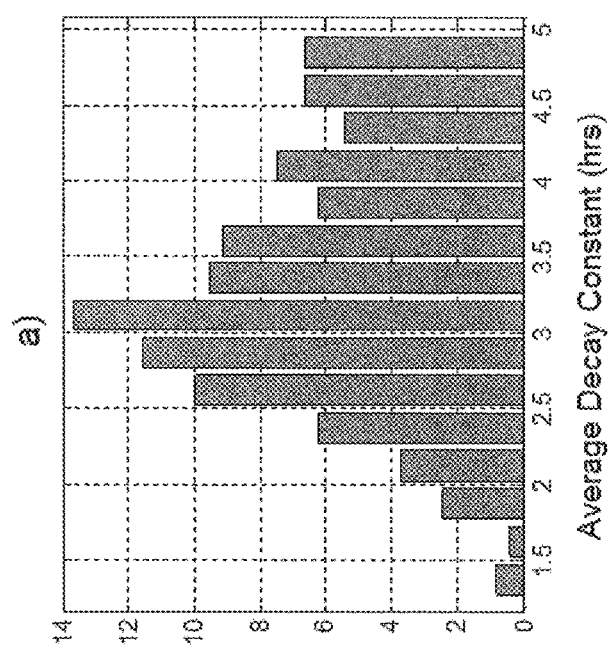

FIGS. 12A and 12B respectively show the probability density functions for projected completion times for a plurality of tissue types and a cumulative distribution function for all completion times, according to an exemplary embodiment of the subject disclosure. Referring to FIG. 12A, the average completion time was 3 hours and 23 minutes. The cumulative density function (CDF) plotted in FIG. 12B represents the integral of FIG. 12A. 36.1% of samples will have sufficient crosslinking agent after 3 hours and 74.7% of samples have completion times of less than 4 hours. Importantly, 100% of samples will be sufficiently diffused after 5 hours. Therefore, FIG. 12B predicts that all samples cold soaked in 10% formalin for 5 hours will stain pristinely with downstream assays.

It may therefore be stated that for all tissue types, $t_{done} \leq 5$ hours for samples up to 7 mm thick cold soaked in 10% formalin. It is important to note that this $t_{done}$ is calculated exclusively from samples 5-7 mm thick. However, because diffusion time scales with the square of tissue thickness, samples smaller than 5 mm will diffuse significantly faster than larger tissues. Because additional time in cold formalin has no detrimental effects on cancer biomarkers or tissue morphological, the presented maximum completion time will well preserve cancer biomarkers and morphology in all samples up to 7 mm thick. Many factors will affect the rate at which the crosslinking agent formalin will perfuse tissue including sample composition, thickness, temperature, orientation in cassette, and preanalytical tissue handling to name a few. The presented time needed in cold formalin is especially powerful because all of these factors are taken into account. Additionally, the large number of samples monitored in the study and the scanning capability of the system ensure 5 hours in cold formalin will ideally preserve tissue despite variability from different types of tissue (inter-sample variation) as well as contributions from tissue heterogeneity (intrasample variation). Moreover, because the slowest diffusing tissues (fat, brain, etc.) were included in this study, it may be asserted that other types of tissues not exclusively monitored will not be the limiting factor of a potential fixation protocol. Thus, all samples up to 7 mm thick may stain properly after 5 hours in cold formalin.

Figure 13:
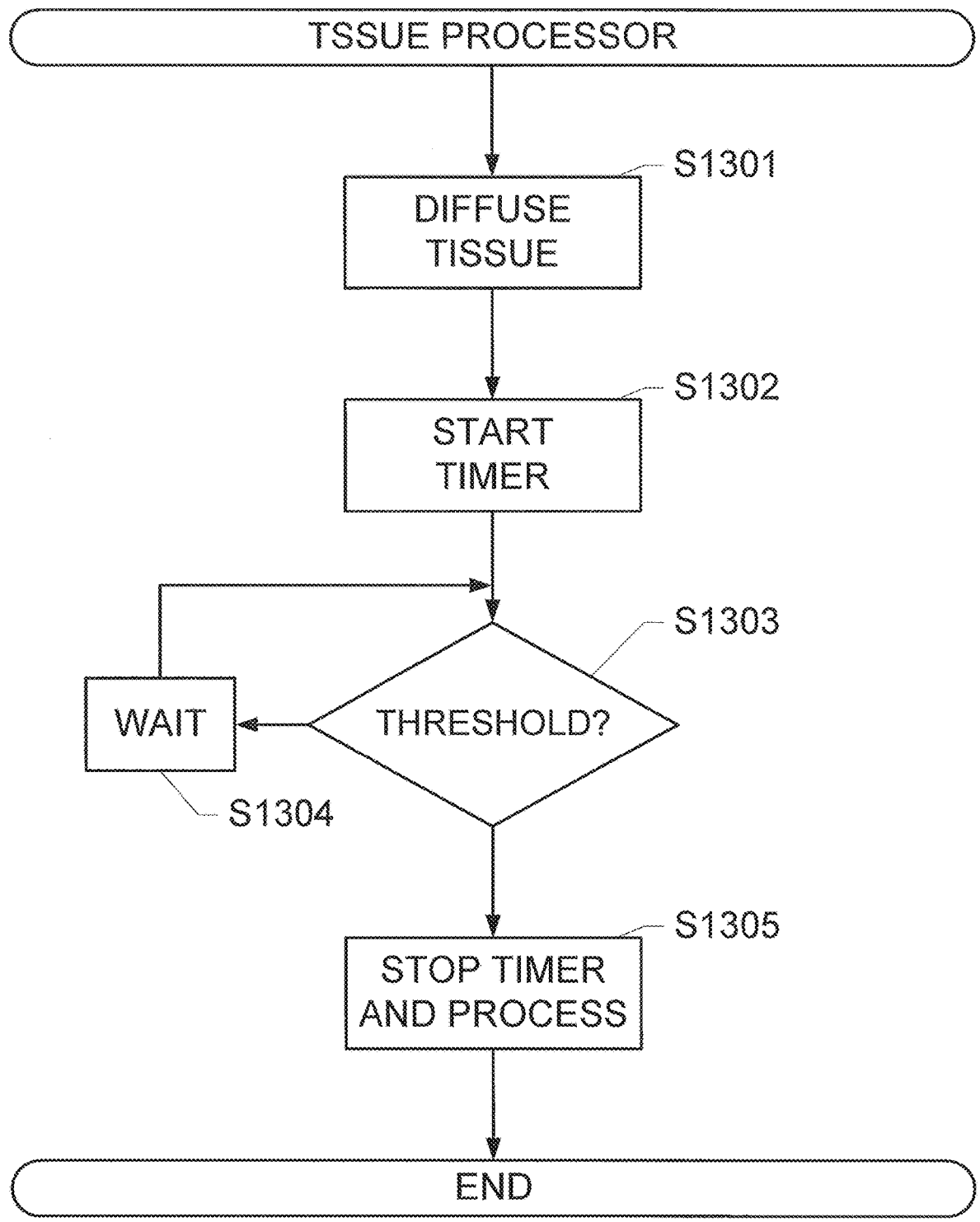
FIG. 13 shows a method for optimizing tissue fixation, according to an exemplary embodiment of the subject disclosure.

Moreover, the dynamic monitoring systems disclosed herein may be included as a protocol that adjusts $t_{done}$ based on tissue type and real-time monitoring of diffusion. FIG. 13 shows a method for optimizing tissue fixation, according to an exemplary embodiment of the subject disclosure. The method begins with formalin diffusion 51301 of tissue samples as described herein. Upon soaking, a timer is started (S1302) and the diffusion of the tissue sample is monitored (S1303). The diffusion may be monitored using the methods described herein, including determining TOF adjusted for environmental factors. A determination is made as to whether or not the tissue is sufficiently diffused (S1303). This may be based on one or more threshold diffusion constants that may be selected based on tissue type, age, etc. For example, the threshold of −7.4%/hr may be used. In either case, if the threshold is not reached, the method simply waits while continuing measurement (S1304). Once the threshold is reached, there is sufficient formaldehyde inside the tissue to guarantee quality staining, and the timer may be stopped (S1305) and the tissue is processed, either by switching to cold formalin for a specified time period, e.g. 1 hour, or any other process.

Therefore, the foregoing disclosure develops a predictive algorithm capable of determining when a tissue sample has diffused in adequate concentrations of formalin to guarantee uniform and ideal histopathological staining. The disclosed systems and methods provide means for accurately predicting when a tissue sample has enough formalin to ideally stain throughout the sample. This provides a guarantee that samples are adequately fixed by automatically lengthening the amount of time slow tissues need to be exposed to formalin, while providing workflow improvements toward shortening the amount of tissue processing time required for tissue samples and adding quality assurance and report generation for tissue processing laboratories. Methods described herein have been validated through monitoring of several hundred pieces of tissue as part of a large tissue collection study. Results suggest all samples will produce high quality staining after 5 hours of passive diffusion in cold formalin. Overall, this technology has the potential to revolutionize preanalytical tissue processing procedures ensuring sample specific handling to well preserve cancer biomarkers and morphology. This methodology may become essential to a personalized medicine workflow by eliminating the need for expensive sample rework by ensuring each specimen is perfectly processed with a rapid fixation protocol that is fully monitored to ensure unparalleled quality assurance.

III. Additional Embodiments of the Disclosed System and Method

Embodiment 1

A method of fixing tissue sample, said method comprising: (a) immersing an unfixed tissue sample in a volume of a fixative solution at a temperature from 0 to 10° C.; (b) monitoring a rate of diffusion of the fixative solution into the tissue sample by: (b1) transmitting an ultrasonic acoustic signal through the tissue sample and detecting the ultrasonic acoustic signal after the ultrasonic acoustic signal has passed through the tissue sample; (b2) calculating the time of flight (TOF) of the ultrasonic acoustic signal; (b3) repeating (b1) and (b2) at a plurality of subsequent time points; (b4) calculating a rate of diffusion at least each of the subsequent time points by analyzing a slope of a curve of the TOFs calculated from the ultrasonic acoustic signals measured at each of the time points; (b5) determining when the rate of diffusion falls below a predetermined threshold; and (c) after the rate of diffusion falls below the predetermined threshold, allowing the tissue sample to warm to a temperature in the range of 20° C. to 55° C. for a period of time sufficient to permit fixation of the tissue sample.

Embodiment 2

The method of embodiment 1, wherein (b4) comprises (a) fitting a TOF trace connecting two or more of the TOFs determined from (b1)-(b3) for respective time points to a single exponential curve, and (b) calculating the rate of diffusion at each time point by: calculating a derivative of the single exponential curve; and optionally, normalizing the derivative by dividing the derivative by an amplitude of the TOF signal at the time point.

Embodiment 3

The method of embodiment 2, wherein the TOF trace is captured at a single location within the tissue sample.

Embodiment 4

The method of embodiment 2 or 3, wherein the single exponential curve is a curve according to Equation I:

$$TOF(t,r) = C(r) + Ae^{-t/\tau(r)} \quad \text{(I), and}$$

wherein the rate of diffusion is calculated according to Equation IIIa:

$$\frac{dTOF(t)}{dt(t=t_o)} = \frac{-A}{\tau} e^{-t_o/\tau}, \quad \text{(IIIa)}$$

wherein C is a constant offset, A is amplitude of decay, $\tau$ is a decay constant, t is diffusion time, and r is the spatial dependence, and $t_0$ is diffusion time at the time point at which the rate of diffusion is calculated.

Embodiment 5

The method of any one of the previous embodiments 2-4, wherein the single exponential curve is a curve according to Equation I:

$$TOF(t,r) = C(r) + Ae^{-t/\tau(r)} \quad \text{(I), and}$$

wherein the rate of diffusion is an amplitude-normalized rate of diffusion is calculated according to Equation IVa:

$$\tilde{m}(t=t_o) = 100 \left( \frac{-1}{\tau} e^{-t_o/\tau} \right), \left[ \frac{\%}{\text{time}} \right], \quad \text{(IVa)}$$

wherein C is a constant offset, A is amplitude of decay, $\tau$ is a decay constant, t is diffusion time, r is the spatial dependence, $\tilde{m}$ is the amplitude-normalized rate of diffusion, $t_0$ is diffusion time at the time point at which the rate of diffusion is calculated, and the brackets indicate the units for rate of diffusion, wherein time is the units of time according to $\tau$.

Embodiment 6

The method of any one of the previous embodiments 2-5, wherein the TOF trace is a spatially-averaged TOF trace obtained by capturing the TOF measurements at a plurality of spatial locations within the tissue sample and spatially averaging the TOF measurements.

Embodiment 7

The method of embodiment 6, wherein the single exponential curve is a curve according to Equation II:

$$TOF_{avg}(t) = \sum_{r=1}^{N} TOF(t,r) = C_{avg} + A_{avg} e^{-t/\tau_{avg}}, \quad \text{(II)}$$

and
wherein the rate of diffusion is calculated according to Equation IIIb:

$$\frac{dTOF(t)}{dt(t=t_o)} = \frac{-A_{avg}}{\tau_{avg}} e^{-t_o/\tau_{avg}}, \quad \text{(IIIb)}$$

wherein $TOF_{avg}$ is the spatially-averaged TOF trace, N is the number of spatial locations at which a measured TOF signal was acquired, $C_{avg}$ is the average constant offset, $A_{avg}$ is the average amplitude of the decay, $\tau_{avg}$ is the average decay constant, and $t_0$ is the diffusion time at the time point at which the rate of diffusion is calculated.

Embodiment 8

The method of embodiment 6, wherein the single exponential curve is a curve according to Equation II:

$$TOF_{avg}(t) = \sum_{r=1}^{N} TOF(t,r) = C_{avg} + A_{avg} e^{-t/\tau_{avg}}, \quad \text{(II)}$$

and
wherein the rate of diffusion is an amplitude-normalized rate of diffusion calculated for a spatially averaged TOF trace according to Equation IVb:

$$\tilde{m}(t=t_o) = 100 \left( \frac{-1}{\tau_{avg}} e^{-t_o/\tau_{avg}} \right), \left[ \frac{\%}{\text{time}} \right], \quad \text{(IVb)}$$

wherein $TOF_{avg}$ is the spatially-averaged TOF trace, N is the number of spatial locations at which a measured TOF signal was acquired, $C_{avg}$ is an average constant offset, $A_{avg}$ is an average amplitude of the decay, $\tau_{avg}$ is the average decay constant, $\tilde{m}$ is the amplitude-normalized rate of diffusion, $t_0$ is diffusion time at the time point at which the rate of diffusion is calculated, and the brackets indicate the units for rate of diffusion, wherein time is the units of time according to $\tau_{avg}$.

Embodiment 9

The method of any of the foregoing embodiments, wherein the threshold rate of diffusion has been met when the rate of diffusion at a discrete time point calculated according to (b4) meets or exceeds the threshold rate of diffusion.

Embodiment 10

The method of any of the foregoing embodiments, wherein determining whether the predetermined threshold rate of diffusion has been met comprises: repeating (b1)-(b4) and fitting the TOFs of two or more of the time points to a single exponential curve until the fit exceeds a predetermined confidence cutoff; and after the fit exceeds the predetermined confidence level, calculating an amount of time needed to reach the predetermined threshold rate of diffusion, wherein the predetermined threshold rate of diffusion has been met when the amount of time needed to reach predetermined threshold rate of diffusion has expired.

Embodiment 11

The method of embodiment 10, wherein the rate of diffusion is an amplitude-normalized rate of diffusion calculated according to Equation IVa, and the time to completion is calculated according to the Equation VIIIa:

$$t_{done}(\tilde{m}) = -\tau \ln(|\tilde{m}_{thres} \cdot \tau|) \quad \text{(VIIIa)},$$

wherein $t_{done}$ is the time to completion, and the $|\ldots|$ symbol indicates the absolute value.

Embodiment 12

The method of embodiment 10, wherein the rate of diffusion is an amplitude-normalized rate of diffusion calculated according to Equation IVb, and the time to completion may be calculated according to the Equation VIIIb:

$$t_{done}(\tilde{m}) = -\tau \ln(|\tilde{m}_{thres} \cdot \tau_{avg}|) \quad \text{(VIIIb)}$$

wherein $t_{done}$ is the time to completion, and the $|\ldots|$ symbol indicates the absolute value.

Embodiment 13

The method of any of the foregoing embodiments, wherein the threshold rate of diffusion has been empirically determined to correlate with the minimal quality of the particular end process.

Embodiment 14

The method of any of the foregoing embodiments, wherein (b2)-(b5) is performed by a signal analyzer.

Embodiment 15

The method of any of the foregoing embodiments, wherein (b1) is performed by an acoustic monitoring system.

Embodiment 16

A histochemical or in situ hybridization method of detecting a labile biomarker in a tissue sample, said method comprising fixing the tissue according to a method of any of embodiments 1-15, applying a detectable label to the fixed tissue sample capable of specifically binding to the labile biomarker, and detecting the presence of the detectable label.

Embodiment 17

The method of any one of embodiments 1-16, wherein the method is a histochemical method and the labile marker is a phosphorylated protein.

Embodiment 18

The method of any one of embodiments 1-16, wherein the method is an in situ hybridization method and the labile marker is a nucleic acid.

Embodiment 19

The method of embodiment 18, wherein the nucleic acid is an miRNA or an mRNA molecule.

Embodiment 20

The method of any of any one of the previous embodiments, wherein the fixative solution comprises formalin.

Embodiment 21

The method of any of any one of the previous embodiments, further comprising identifying the type of the tissue the tissue sample was derived from by: comparing the rate of diffusion obtained in step b4 with one or empirically determined, tissue-type specific and/or cancer-type specific reference diffusion rates, whereby the one of the reference diffusion rates that is the most similar to the diffusion rate obtained in step b4 is used as an indicator of the type of tissue and/or the type of tumor from which the tissue sample was derived.

Embodiment 22

A system for monitoring diffusion of a fixative into a tissue sample, said system comprising: (a) a signal analyzer containing a processor (105) and a memory coupled to the processor, wherein the memory stores computer-executable instructions that cause the processor to perform operations comprising: (a1) fitting a time of flight (TOF) trace to a single exponential curve, the TOF trace comprising a plurality of TOF measurements of an ultrasonic signal transmitted through the tissue sample at a plurality of time points the TOF trace, and (a2) calculating the rate of diffusion at each time point by: calculating a derivative of the single exponential curve; and optionally, normalizing the derivative by dividing the derivative by an amplitude of the signal at the time point.

Embodiment 23

The system of embodiment 22, wherein the TOF measurements are captured at a single location within the tissue sample.

Embodiment 24

The system of embodiment 22 or 23, wherein the single exponential curve is a curve according to Equation I:

$$TOF(t,r) = C(r) + Ae^{-t/\tau(r)} \quad \text{(I), and}$$

wherein the rate of diffusion is calculated according to Equation IIIa:

$$\frac{dTOF(t)}{dt(t=t_o)} = \frac{-A}{\tau} e^{-t_o/\tau}, \quad \text{(IIIa)}$$

wherein C is a constant offset, A is amplitude of decay, $\tau$ is a decay constant, t is diffusion time, and r is the spatial dependence, and $t_0$ is diffusion time at the time point at which the rate of diffusion is calculated.

Embodiment 25

The system of embodiment 22 or 23, wherein the single exponential curve is a curve according to Equation I:

$$TOF(t,r) = C(r) + Ae^{-t/\tau(r)} \qquad \text{(I), and}$$

wherein the rate of diffusion is an amplitude-normalized rate of diffusion calculated according to Equation IVa:

$$\tilde{m}(t = t_o) = 100\left(\frac{-1}{\tau}e^{-t_o/\tau}\right), \left[\frac{\%}{\text{time}}\right], \qquad \text{(IVa)}$$

wherein C is a constant offset, A is amplitude of decay, $\tau$ is a decay constant, t is diffusion time, r is the spatial dependence, $\tilde{m}$ is the amplitude-normalized rate of diffusion, $t_0$ is diffusion time at the time point at which the rate of diffusion is calculated, and the brackets indicate the units for rate of diffusion, wherein time is the units of time according to $\tau$.

Embodiment 26

The system of any one of embodiments 22-25, wherein the TOF trace is a spatially-averaged TOF trace obtained by capturing the TOF measurements at a plurality of spatial locations within the tissue sample and spatially averaging the TOF measurements.

Embodiment 27

The system of embodiment 26, wherein the single exponential curve is a curve according to Equation II:

$$TOF_{avg}(t) = \sum_{r=1}^{N} TOF(t, r) = C_{avg} + A_{avg}e^{-t/\tau_{avg}}, \qquad \text{(II)}$$

and
wherein the rate of diffusion is calculated according to Equation IIIb:

$$\frac{dTOF(t)}{dt(t = t_o)} = \frac{-A_{avg}}{\tau_{avg}} e^{-t_o/\tau_{avg}}, \qquad \text{(IIIb)}$$

wherein $TOF_{avg}$ is the spatially-averaged TOF trace, N is the number of spatial locations at which a measured TOF signal was acquired, $C_{avg}$ is the average constant offset, $A_{avg}$ is the average amplitude of the decay, $\tau_{avg}$ is the average decay constant, and $t_0$ is the diffusion time at the time point at which the rate of diffusion is calculated.

Embodiment 28

The system of embodiment 26, wherein the single exponential curve is a curve according to Equation II:

$$TOF_{avg}(t) = \sum_{r=1}^{N} TOF(t, r) = C_{avg} + A_{avg}e^{-t/\tau_{avg}}, \qquad \text{(II)}$$

and
wherein the rate of diffusion is an amplitude-normalized rate of diffusion calculated for a spatially averaged TOF trace according to Equation IVb:

$$\tilde{m}(t = t_o) = 100\left(\frac{-1}{\tau_{avg}}e^{-t_o/\tau_{avg}}\right), \left[\frac{\%}{\text{time}}\right], \qquad \text{(IVb)}$$

wherein $TOF_{avg}$ is the spatially-averaged TOF trace, N is the number of spatial locations at which a measured TOF signal was acquired, $C_{avg}$ is an average constant offset, $A_{avg}$ is an average amplitude of the decay, $\tau_{avg}$ is the average decay constant, $\tilde{m}$ is the amplitude-normalized rate of diffusion, $t_0$ is diffusion time at the time point at which the rate of diffusion is calculated, and the brackets indicate the units for rate of diffusion, wherein time is the units of time according to $\tau_{avg}$.

Embodiment 29

The system of any of embodiments 22-28, wherein the instructions further comprise: (a3) determining whether a predetermined threshold rate of diffusion has been met.

Embodiment 30

The system of embodiment 29, wherein the threshold rate of diffusion has been met when the rate of diffusion at a discrete time point is identical to the predetermined threshold rate of diffusion.

Embodiment 31

The system of embodiment 29, wherein determining whether the predetermined threshold rate of diffusion has been met comprises: acquiring TOF traces and fitting the TOF traces to the single exponential curve until the fit exceeds a predetermined confidence cutoff; after the fit exceeds the predetermined confidence level, calculating an amount of time needed to reach the predetermined threshold rate of diffusion, wherein the predetermined threshold rate of diffusion has been met when the amount of time needed to reach predetermined threshold rate of diffusion has expired.

Embodiment 32

The system of embodiment 31, wherein the rate of diffusion is an amplitude-normalized rate of diffusion calculated according to Equation IVa, and the time to completion is calculated according to the Equation VIIIa:

$$t_{done}(\tilde{m}) = -\tau \ln(|\tilde{m}_{thres} \cdot \tau|) \qquad \text{(VIIIa),}$$

wherein $t_{done}$ is the time to completion, and the |...| symbol indicates the absolute value.

Embodiment 33

The system of embodiment 31, wherein the rate of diffusion is an amplitude-normalized rate of diffusion calculated according to Equation IVb, and the time to completion may be calculated according to the Equation VIIIb:

$$t_{done}(\tilde{m}) = -\tau \ln(|\tilde{m}_{thres} \cdot \tau_{avg}|) \qquad \text{(VIIIb)}$$

wherein $\tau_{done}$ is the time to completion, and the $|\ldots|$ symbol indicates the absolute value.

Embodiment 34

The system of any of embodiments 29-33, wherein the threshold rate of diffusion correlates with a minimal quality of a process to be performed on the tissue sample after fixation, and wherein the threshold rate of diffusion has been empirically determined to correlate with the minimal quality of the particular end process.

Embodiment 35

The system of embodiment 34, wherein the process to be performed on the tissue sample after fixation comprises a histochemical process or an in situ hybridization process.

Embodiment 36

The system of embodiment 35, wherein the histochemical process or the in situ hybridization process comprises detection of a labile biomarker.

Embodiment 37

The system of embodiment 34, wherein the threshold is a threshold rate of diffusion of at least −7.4% per hour.

Embodiment 38

The system of any of embodiments 29-37, wherein the system is adapted to trigger a notification system and/or to perform a subsequent process on the tissue sample when the predetermined threshold rate of diffusion is met.

Embodiment 39

The system of embodiments 21-38, wherein the system further comprises: an acoustic monitoring system for performing the TOF measurements, and wherein the operations performed by the processor further comprise calculating TOF from a set of acoustic data obtained from the acoustic monitoring system.

Embodiment 40

The system of embodiment 39, wherein the TOF calculated from the acoustic data set is a reference-compensated TOF.

Embodiment 41

The system of embodiment 39 or 40, wherein the acoustic monitoring system is adapted to perform the TOF measurements at a plurality of locations in the tissue sample.

Embodiment 42

A tangible non-transitory computer-readable medium to store computer-readable code that is executed by a processor to perform operations comprising: monitoring a time of flight (TOF) of an acoustic wave traversing a tissue sample immersed in a fixative; calculating a rate of diffusion based on the (TOF); and comparing the rate of diffusion with a threshold to determine an optimal time to remove the tissue sample from the fixative.

Embodiment 43

The computer-readable medium of embodiment 42, wherein the operations further comprise performing a fixation process on the tissue sample after the fixative has displaced a target volume of interstitial fluid from the tissue sample.

Embodiment 44

The computer-readable medium of embodiment 43, wherein performing the fixation process includes heating the tissue sample to promoting cross-linking of the tissue sample.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A system for monitoring diffusion of a fixative into a biological sample, said system comprising:
   (a) a signal analyzer containing one or more processors and one or more memories coupled to the one or more processors, wherein the one or more memories stores computer-executable instructions that cause the processor to perform operations comprising:
      (a1) fitting a time of flight (TOF) trace to a single exponential curve, the TOF trace comprising a plurality of TOF signal measurements transmitted through the biological sample at a plurality of time points, and
      (a2) computing the rate of diffusion at each time point of the plurality of time points by calculating a derivative of the single exponential curve.

2. The system of claim 1, wherein the computation of the rate of diffusion at each time point of the plurality of time points further comprises normalizing the calculated derivative by dividing the derivative by an amplitude of the signal at the time point.

3. The system of claim 1, wherein the TOF signal measurements are captured at a single location within the biological sample.

4. The system of claim 1, wherein the single exponential curve is a curve according to Equation I:

$$TOF(t,r) = C(r) + Ae^{-t/\tau(r)} \qquad \text{(I), and}$$

wherein the rate of diffusion is computed according to Equation IIIa:

$$\frac{dTOF(t)}{dt(t=t_o)} = \frac{-A}{\tau}e^{-t_o/\tau}, \quad \text{(IIIa)}$$

wherein C is a constant offset, A is amplitude of decay, τ is a decay constant, t is diffusion time, and r is the spatial dependence, and $t_0$ is diffusion time at the time point at which the rate of diffusion is calculated.

5. The system of claim 1, wherein the single exponential curve is a curve according to Equation I:

$$TOF(t,r) = C(r) + Ae^{-t/\tau(r)} \quad \text{(I), and}$$

wherein the rate of diffusion is an amplitude-normalized rate of diffusion computed according to Equation IVa:

$$\tilde{m}(t=t_o) = 100\left(\frac{-1}{\tau}e^{-t_o/\tau}\right), \left[\frac{\%}{\text{time}}\right], \quad \text{(IVa)}$$

wherein C is a constant offset, A is amplitude of decay, τ is a decay constant, t is diffusion time, r is the spatial dependence, m̃ is the amplitude-normalized rate of diffusion, $t_0$ is diffusion time at the time point at which the rate of diffusion is calculated, and the brackets indicate the units for rate of diffusion, wherein time is the units of time according to τ.

6. The system of claim 1, wherein the TOF trace is a spatially-averaged TOF trace obtained by capturing the TOF signal measurements at a plurality of spatial locations within the biological sample and spatially averaging the TOF signal measurements.

7. The system of claim 6, wherein the single exponential curve is a curve according to Equation II:

$$TOF_{avg}(t) = \sum_{r=1}^{N} TOF(t,r) = C_{avg} + A_{avg}e^{-t/\tau_{avg}}, \quad \text{(II)}$$

and
wherein the rate of diffusion is calculated according to Equation IIIb:

$$\frac{dTOF(t)}{dt(t=t_o)} = \frac{-A_{avg}}{\tau_{avg}}e^{-t_o/\tau_{avg}}, \quad \text{(IIIb)}$$

wherein $TOF_{avg}$ is the spatially-averaged TOF trace, N is the number of spatial locations at which a measured TOF signal was acquired, $C_{avg}$ is the average constant offset, $A_{avg}$ is the average amplitude of the decay, $\tau_{avg}$ the average decay constant, and $t_0$ is the diffusion time at the time point at which the rate of diffusion is calculated.

8. The system of claim 6, wherein the single exponential curve is a curve according to Equation II:

$$TOF_{avg}(t) = \sum_{r=1}^{N} TOF(t,r) = C_{avg} + A_{avg}e^{-t/\tau_{avg}}, \quad \text{(II)}$$

and
wherein the rate of diffusion is an amplitude-normalized rate of diffusion calculated for a spatially averaged TOF trace according to Equation IVb:

$$\tilde{m}(t=t_o) = 100\left(\frac{-1}{\tau_{avg}}e^{-t_o/\tau_{avg}}\right), \left[\frac{\%}{\text{time}}\right], \quad \text{(IVb)}$$

wherein $TOF_{avg}$ is the spatially-averaged TOF trace, N is the number of spatial locations at which a measured TOF signal was acquired, $C_{avg}$ is an average constant offset, $A_{avg}$ is an average amplitude of the decay, $\tau_{avg}$ the average decay constant, m̃ is the amplitude-normalized rate of diffusion, $t_0$ is diffusion time at the time point at which the rate of diffusion is calculated, and the brackets indicate the units for rate of diffusion, wherein time is the units of time according to $\tau_{avg}$.

9. The system of claim 1, wherein the instructions further comprise: determining whether a predetermined threshold rate of diffusion has been met.

10. The system of claim 9, wherein the threshold rate of diffusion has been met when the rate of diffusion at a discrete time point is identical to the predetermined threshold rate of diffusion.

11. The system of claim 9, wherein determining whether the predetermined threshold rate of diffusion has been met comprises:
  acquiring TOF traces and fitting the TOF traces to the single exponential curve until the fit exceeds a predetermined confidence cutoff;
  after the fit exceeds the predetermined confidence level, calculating an amount of time needed to reach the predetermined threshold rate of diffusion, wherein the predetermined threshold rate of diffusion has been met when the amount of time needed to reach predetermined threshold rate of diffusion has expired.

12. The system of claim 11, wherein the rate of diffusion is an amplitude-normalized rate of diffusion calculated according to Equation IVa, and the time to completion is calculated according to the Equation VIIIa:

$$t_{done}(\tilde{m}) = -\tau \ln(|\tilde{m}_{thres} \cdot \tau|) \quad \text{(VIIIa)},$$

wherein $t_{done}$ is the time to completion, and | . . . | symbol indicates the absolute value.

13. The system of claim 11, wherein the rate of diffusion is an amplitude-normalized rate of diffusion calculated according to Equation IVb, and the time to completion may be calculated according to the Equation VIIIb:

$$t_{done}(\tilde{m}) = -\tau \ln(|\tilde{m}_{thres} \cdot \tau_{avg}|) \quad \text{(VIIIb)}$$

wherein $t_{done}$ is the time to completion, and the | . . . | symbol indicates the absolute value.

14. The system of claim 9, wherein the threshold rate of diffusion correlates with a minimal quality of a process to be performed on the biological sample after fixation, and wherein the threshold rate of diffusion has been empirically determined to correlate with the minimal quality of the particular end process.

15. The system of claim 14, wherein the process to be performed on the biological sample after fixation comprises a histochemical process or an in situ hybridization process.

16. The system of claim 15, wherein the histochemical process or the in situ hybridization process comprises detection of a labile biomarker.

17. The system of claim 14, wherein the threshold is a threshold rate of diffusion of at least −7.4% per hour.

18. The system of claim 9, wherein the system is adapted to trigger a notification system and/or to perform a subsequent process on the biological sample when the predetermined threshold rate of diffusion is met.

19. A method of fixing tissue sample, said method comprising:
  (a) immersing an unfixed tissue sample in a volume of a fixative solution at a temperature from 0 to 10° C.;
  (b) monitoring a rate of diffusion of the fixative solution into the tissue sample by:
    (b1) transmitting an ultrasonic acoustic signal through the tissue sample and detecting the ultrasonic acoustic signal after the ultrasonic signal has passed through the tissue sample;
    (b2) calculating the time of flight (TOF) of the ultrasonic acoustic signal;
    (b3) repeating (b1) and (b2) at a plurality of subsequent time points;
    (b4) calculating a rate of diffusion at least at each of the subsequent time points by analyzing a slope of a curve of the TOFs calculated from the ultrasonic acoustic signals measured at each of the time points;
    (b5) determining when the rate of diffusion falls below a predetermined threshold; and
  (c) after the rate of diffusion falls below the predetermined threshold, allowing the tissue sample to warm to a temperature in the range of 20° C. to 55° C. for a period of time sufficient to permit fixation of the tissue sample.

20. The method of claim 19, wherein (b4) comprises
  (a) fitting a TOF trace connecting two or more of the TOFs determined from (b1)-(b3) for respective time points to a single exponential curve, and
  (b) calculating the rate of diffusion at each time point by:
    calculating a derivative of the single exponential curve; and
    optionally, normalizing the derivative by dividing the derivative by an amplitude of the TOF signal at the time point.

* * * * *